United States Patent
Yamamoto et al.

(10) Patent No.: US 9,965,912 B2
(45) Date of Patent: *May 8, 2018

(54) ON-VEHICLE APPARATUS CONTROL SYSTEM, ON-VEHICLE CONTROL DEVICE, AND PORTABLE MACHINE

(71) Applicants: Masahiro Yamamoto, Aichi (JP); Yoichi Atsumi, Aichi (JP)

(72) Inventors: Masahiro Yamamoto, Aichi (JP); Yoichi Atsumi, Aichi (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/211,059

(22) Filed: Jul. 15, 2016

(65) Prior Publication Data

US 2017/0021801 A1 Jan. 26, 2017

(30) Foreign Application Priority Data

Jul. 23, 2015 (JP) ................................. 2015-145663

(51) Int. Cl.
*G07C 9/00* (2006.01)
*B60R 25/24* (2013.01)

(52) U.S. Cl.
CPC .......... *G07C 9/00714* (2013.01); *B60R 25/24* (2013.01); *B60R 25/245* (2013.01);
(Continued)

(58) Field of Classification Search
CPC ............ G07C 9/00714; G07C 9/00309; G07C 2009/00769; G07C 2209/63; B60R 25/24; B60R 25/245; B60R 2325/108
See application file for complete search history.

(56) References Cited

U.S. PATENT DOCUMENTS 6,556,125 B1 * 4/2003 Rohrl ................. G07C 9/00309
340/5.62
6,624,758 B1 * 9/2003 Omata ............... G07C 9/00309
180/287

(Continued)

FOREIGN PATENT DOCUMENTS

JP 2008-106463 A 5/2008
JP 2009-013697 A 1/2009

(Continued)

OTHER PUBLICATIONS

Notification of Reasons for Refusal issued in corresponding Japanese Application No. 2015-145663, dated Oct. 24, 2017 (6 pages).

*Primary Examiner* — Behrang Badii
*Assistant Examiner* — Daniel L Greene
(74) *Attorney, Agent, or Firm* — Osha Liang LLP

(57) ABSTRACT

An on-vehicle apparatus control system includes: a first on-vehicle switch and a second located farther from an on-vehicle reception unit than the first on-vehicle switch; an on-vehicle control device; and a portable machine. In a case where the on-vehicle switches is operated, the on-vehicle control device transmits a response request signal to the portable machine, the portable machine returns a response signal, and the on-vehicle control device controls an on-vehicle apparatus. The on-vehicle apparatus control system further includes a level switch. In a case where the first on-vehicle switch is operated, the level switch switches transmission intensity of a portable machine transmission unit or reception sensitivity of an on-vehicle reception unit to a first level, and in a case where the second on-vehicle switch is operated, the level switch switches the transmission intensity or the reception sensitivity to a second level higher than the first level.

8 Claims, 12 Drawing Sheets

(52) U.S. Cl.
CPC .... *G07C 9/00309* (2013.01); *B60R 2325/108* (2013.01); *G07C 2009/00769* (2013.01); *G07C 2209/63* (2013.01)

(56) References Cited

U.S. PATENT DOCUMENTS

| | | | | |
|---|---|---|---|---|
| 6,816,081 | B1* | 11/2004 | Okada | G07C 9/00182 340/12.5 |
| 8,310,338 | B2* | 11/2012 | Hamada | B60R 25/245 340/5.6 |
| 2006/0261925 | A1* | 11/2006 | Baumgartner | B60R 25/04 340/5.62 |
| 2007/0024416 | A1* | 2/2007 | Tang | B60R 25/245 340/5.61 |
| 2015/0329081 | A1* | 11/2015 | Morita | H04B 17/318 701/2 |
| 2017/0004664 | A1* | 1/2017 | Yamamoto | G07C 9/00309 |

FOREIGN PATENT DOCUMENTS

| | | |
|---|---|---|
| JP | 2009-144367 A | 7/2009 |
| JP | 2010-121297 A | 6/2010 |
| JP | 2015-098757 A | 5/2015 |

\* cited by examiner

RF SIGNAL (TRANSMISSION INTENSITY; FIRST LEVEL)

RF SIGNAL (TRANSMISSION INTENSITY; SECOND LEVEL)

RF SIGNAL (TRANSMISSION INTENSITY; THIRD LEVEL)

<RESPONSE REQUEST SIGNAL>

| 41 | 42 | | 43 |
|---|---|---|---|
| RESPONSE REQUEST INFORMATION | ID REQUEST INFORMATION | ..... | REQUEST SWITCH INFORMATION |

FIG. 8

<RESPONSE REQUEST SIGNAL>

| 41 | 42 | | 44 |
|---|---|---|---|
| RESPONSE REQUEST INFORMATION | ID REQUEST INFORMATION | ..... | LF TRANSMISSION ANTENNA INFORMATION |

ON-VEHICLE APPARATUS CONTROL SYSTEM, ON-VEHICLE CONTROL DEVICE, AND PORTABLE MACHINE

CROSS-REFERENCES TO RELATED APPLICATIONS

This application is based upon and claims the benefit of priority from Japanese Patent Application No. 2015-145663, filed on Jul. 23, 2015; the entire contents of which are incorporated herein by reference.

FIELD

One or more embodiments of the present invention relate to an on-vehicle apparatus control system in which an on-vehicle apparatus is controlled on the basis of radio signals which are transmitted and received between an on-vehicle control device mounted on a vehicle and a portable machine carried by a user.

BACKGROUND

There is an on-vehicle apparatus control system in which control of an on-vehicle apparatus is performed, such as locking and unlocking of a door on the basis of radio signals which are transmitted and received between an on-vehicle control device mounted on a vehicle and a portable machine carried by a user. Communication methods between the on-vehicle control device and the portable machine are roughly classified into three methods such as a polling method, a passive entry method, and a keyless entry method.

In the polling method, the on-vehicle control device transmits a response request signal at a predetermined cycle regardless of a position of the portable machine. If the response request signal is received, the portable machine returns a response signal to the on-vehicle control device. In the passive entry method, when a user comes close to or comes into contact with a door knob, a passive request switch is turned on, and the on-vehicle control device transmits a response request signal to the portable machine. If the response request signal is received, the portable machine returns a response signal to the on-vehicle control device. In the keyless entry method, a response request signal is not transmitted from the on-vehicle control device to the portable machine, and, when the user operates the portable machine, a remote control signal is transmitted to the on-vehicle control device from the portable machine. In any case, if the response signal or the remote control signal is received from the portable machine, the on-vehicle control device performs collation between ID codes included in the signal. If the collation is successful, the on-vehicle control device locks or unlocks a door of the vehicle.

The on-vehicle control device is provided with an on-vehicle transmission unit which transmits a response request signal to the portable machine, and an on-vehicle reception unit which receives a response signal or a remote control signal from the portable machine. For example, as disclosed in JP-A-2009-144367, the on-vehicle transmission unit is provided in plurality inside a vehicle interior or on an outer surface of a vehicle. The on-vehicle reception unit may be provided alone in the vehicle interior of the vehicle. On-vehicle switch means such as an access switch is provided on an outer surface of a door of the vehicle.

In JP-A-2009-144367, in order for a response request signal transmitted from the on-vehicle transmission unit to be easily received by the portable machine located around the vehicle regardless of a position of the on-vehicle transmission unit, the transmission intensity of the response request signal transmitted from the on-vehicle transmission unit is switched according to the operated access switch. Specifically, in a case where the access switch located near the on-vehicle transmission unit is operated, the transmission intensity of a response request signal transmitted from the on-vehicle transmission unit is low. In a case where the access switch separated from the on-vehicle transmission unit is operated, the transmission intensity of a response request signal transmitted from the on-vehicle transmission unit is high.

Meanwhile, in a case of the polling method or the passive entry method, for example, an illegal communication act may be performed in which the portable machine which is far away imitates a state of being in close proximity to a vehicle as a result of a relay relaying a response request signal transmitted from the on-vehicle control device and the portable machine receiving the response request signal. The illegal communication act using the relay is called relay attack. A malicious third party who is not an owner of a vehicle may commit a crime such as theft of the vehicle by unlocking a door of the vehicle or starting an engine through the relay attack.

Therefore, regarding crime prevention countermeasures against the relay attack, for example, in JP-A-2010-121297, a distance between an on-vehicle transmission unit and a portable machine is calculated on the basis of the electric field intensity of a response request signal received by the portable machine, and a distance between the portable machine and an on-vehicle reception unit is calculated on the basis of the electric field intensity of a response signal received by the on-vehicle reception unit. In a case where there is a considerable difference between both of the distances, a door of a vehicle is not unlocked.

In JP-A-2010-121297, the portable machine lowers the transmission intensity of a response signal as a calculated distance between the on-vehicle transmission unit and the portable machine is short. As mentioned above, since the transmission intensity of a response signal from the portable machine is lowered, a signal transmitted from the portable machine which is far away from the vehicle is not received by the on-vehicle control device even if relay attack is performed, and thus the door of the vehicle is not unlocked.

If the transmission intensity of a response signal from a portable machine is low, relay attack can be prevented, but, on the other hand, communication performance between the portable machine carried by a legal user and an on-vehicle control device is reduced. Specifically, during passive entry, for example, in a case where a legal user operates on-vehicle switch means located at a position separated from the on-vehicle reception unit, the transmission intensity of a response signal transmitted from the portable machine carried by the user is low, and thus there is a concern that the response signal may not be received by the on-vehicle reception unit. In this case, the door of the vehicle is not unlocked and thus convenience of the passive entry disappears.

SUMMARY

One or more embodiments of the present invention ensure communication performance between an on-vehicle control device and a portable machine when a legal user performs an operation, while preventing relay attack.

In accordance with one aspect of the present invention, an on-vehicle apparatus control system includes: a plurality of on-vehicle switches disposed on an outer surface of a vehicle; an on-vehicle control device mounted on the vehicle and including an on-vehicle transmission unit and an on-vehicle reception unit; and a portable machine carried by a user and including a portable machine transmission unit and a portable machine reception unit. In a case where one of the on-vehicle switches is operated, the on-vehicle control device causes the on-vehicle transmission unit to transmit a response request signal, the portable machine causes the portable machine transmission unit to return a response signal in response to reception of the response request signal in the portable machine reception unit, and the on-vehicle control device causes the on-vehicle reception unit to receive the response signal, and controls an on-vehicle apparatus mounted on the vehicle on a basis of the response signal. The on-vehicle switches includes: a first on-vehicle switch; and a second on-vehicle switch located at a position farther from the on-vehicle reception unit than the first on-vehicle switch. The on-vehicle apparatus control system further includes a level switch that switches transmission intensity of a signal transmitted from the portable machine transmission unit, or reception sensitivity of a signal received by the on-vehicle reception unit. In a case where the first on-vehicle switch is operated, the level switch switches the transmission intensity or the reception sensitivity to a first level. In a case where the second on-vehicle switch is operated, the level switch switches the transmission intensity or the reception sensitivity to a second level higher than the first level.

In accordance with another aspect of the present invention, an on-vehicle control device is mounted on a vehicle and includes: an on-vehicle transmission unit; and an on-vehicle reception unit. In a case where one of a first on-vehicle switch disposed on an outer surface of the vehicle and a second on-vehicle switch disposed on the outer surface of the vehicle and farther from the on-vehicle reception unit than the first on-vehicle switch is operated, the on-vehicle transmission unit transmits a response request signal to a portable machine carried by a user, and the on-vehicle reception unit receives a response signal transmitted from the portable machine in response to reception of the response request signal in the portable machine, and an on-vehicle apparatus mounted on the vehicle is controlled on a basis of the response signal. The on-vehicle transmission unit transmits the response request signal to the portable machine: in a case where the first on-vehicle switch is operated, the response request signal including information for recognizing the first on-vehicle switch so as to allow the portable machine to set signal transmission intensity to a first level; and in a case where the second on-vehicle switch is operated, the response request signal including information for recognizing the second on-vehicle switch so as to allow the portable machine to set signal transmission intensity to a second level higher than the first level.

In accordance with the aspect of the present invention, the on-vehicle control device further includes a level switch that switches reception sensitivity of a signal received by the on-vehicle reception unit, in a case where the first on-vehicle switch is operated, the level switch switches the reception sensitivity to a first level, and, in a case where the second on-vehicle switch is operated, the level switch switches the reception sensitivity to a second level higher than the first level.

In accordance with still another aspect of the present invention, a portable machine carried by a user includes: a portable machine transmission unit; and a portable machine reception unit. In a case where one of a first on-vehicle switch disposed on an outer surface of a vehicle and a second on-vehicle switch disposed on the outer surface of the vehicle and farther from on-vehicle reception unit than the first on-vehicle switch is operated, the portable machine reception unit receives a response request signal transmitted from an on-vehicle control device mounted on the vehicle, and the portable machine transmission unit transmits a response signal to the on-vehicle control device so as to allow the on-vehicle control device to control an on-vehicle apparatus mounted on the vehicle. The portable machine further includes a level switch that switches transmission intensity of a signal transmitted from the portable machine transmission unit. If the portable machine reception unit receives the response request signal from the on-vehicle control device, information included in the response request signal for recognizing an operated on-vehicle switch is referred to. In a case where the operated on-vehicle switch is the first on-vehicle switch, the level switch switches the transmission intensity to a first level, and, in a case where the operated on-vehicle switch is the second on-vehicle switch, the level switch switches the transmission intensity to a second level higher than the first level.

According to the aspect, in a case where a legal user carrying the portable machine operates the first on-vehicle switch, the transmission intensity of a signal transmitted from the portable machine transmission unit or the reception sensitivity of a signal received by the on-vehicle reception unit is switched to the first level, in a case where the legal user operates the second on-vehicle switch farther from the on-vehicle reception unit than the first on-vehicle switch, the transmission intensity of a signal transmitted from the portable machine transmission unit or the reception sensitivity of a signal received by the on-vehicle reception unit is switched to the second level higher than the first level. Thus, even if the legal user carrying the portable machine operates any on-vehicle switch, a response request signal transmitted from the on-vehicle control device can be received by the portable machine, and then a response signal transmitted from portable machine can be received by the on-vehicle reception unit. Therefore, it is possible to ensure communication performance between the on-vehicle control device and the portable machine when a legal user performs an operation. The transmission intensity in the portable machine or the reception sensitivity (the first level and the second level) in the on-vehicle control device in a case where the on-vehicle switch is operated is made lower than the transmission intensity or the reception sensitivity during a normal time in which the on-vehicle switches are not operated. Thus, in a case where a relay attack using a relay is performed, it is more difficult for the on-vehicle reception unit to receive the response signal which is transmitted from the portable machine and is relayed by the relay than during the normal time. Therefore, it is possible to prevent the relay attack using the relay.

In accordance with the aspect of the present invention, the portable machine may further include portable machine switch that operates the on-vehicle apparatus. In a case where the portable machine switch is operated, the portable machine transmission unit transmits a remote control signal, and the on-vehicle control device causes the on-vehicle reception unit to receive the remote control signal, and controls the on-vehicle apparatus on the basis of the remote control signal. During a normal time in which the on-vehicle switches are not operated, the level switch disposed in the portable machine or the on-vehicle control device may switch the transmission intensity of a signal transmitted from the portable machine transmission unit or the reception sensitivity of a signal received by the on-vehicle reception unit, to the third level higher than the second level.

According to one or more embodiments of the present invention, it is possible to ensure communication performance between an on-vehicle control device and a portable machine when a legal user performs an operation, while preventing relay attack.

BRIEF DESCRIPTION OF THE DRAWINGS

FIG. 7 is a diagram illustrating an example of information included in a response request signal transmitted by the on-vehicle control device illustrated in FIG. 1;

FIG. 8 is a diagram illustrating another example of information included in a response request signal transmitted by the on-vehicle control device illustrated in FIG. 1;

DETAILED DESCRIPTION

Figure 1:
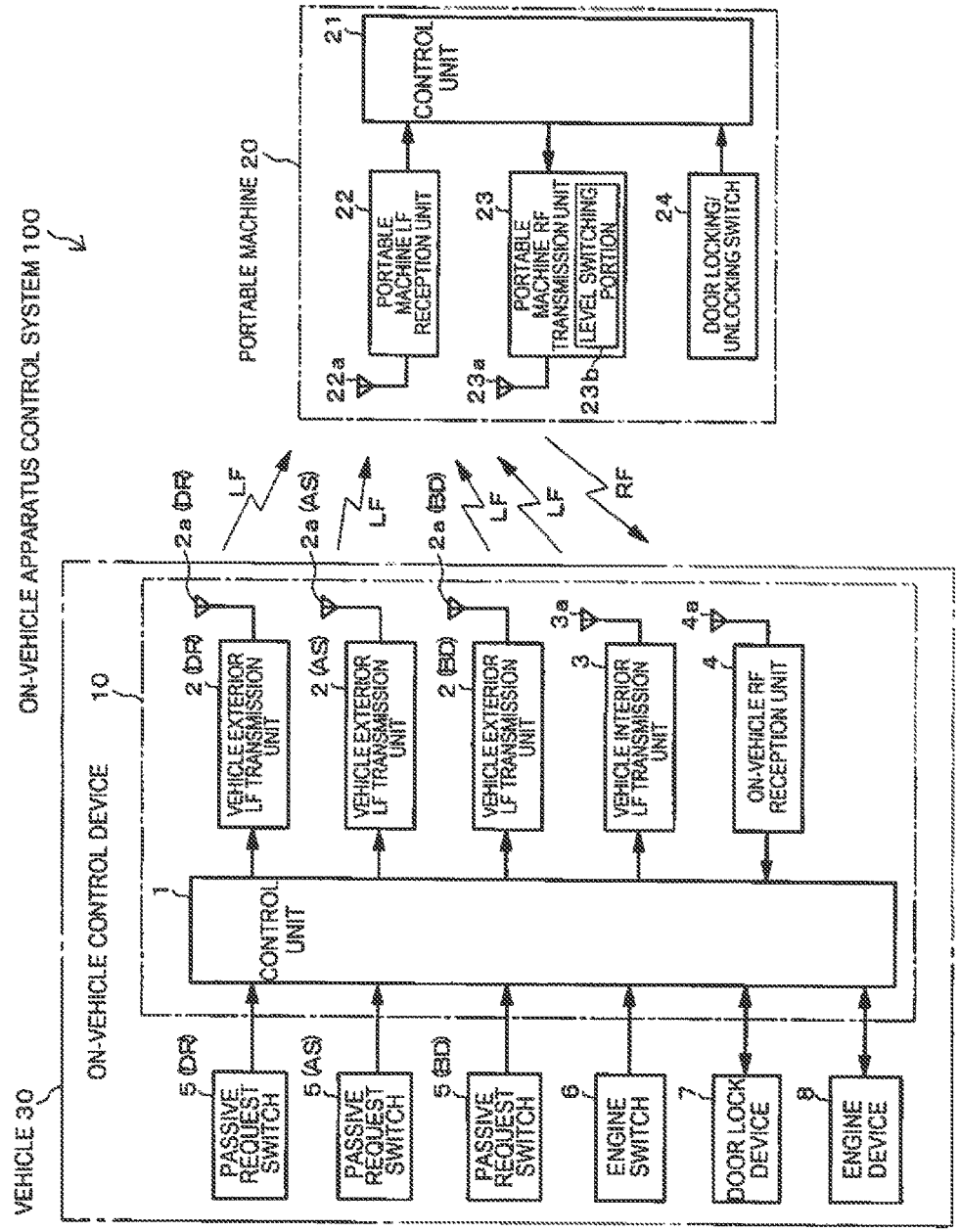
FIG. 1 is a configuration diagram of an on-vehicle apparatus control system according to a first embodiment of the present invention.

In embodiments of the invention, numerous specific details are set forth in order to provide a thorough understanding of the invention. However, it will be apparent to one of ordinary skill in the art that the invention may be practiced without these specific details. In other instances, well-known features have not been described in detail to avoid obscuring the invention.

Hereinafter, embodiments of the present invention will be described with reference to the drawings. The same portions or corresponding portions are given the same reference numerals throughout the drawings.

First, with reference to FIGS. 1 to 3, a description will be made of a configuration of an on-vehicle apparatus control system 100 according to a first embodiment.

FIG. 1 is a diagram illustrating a configuration of the on-vehicle apparatus control system 100 according to the first embodiment. FIG. 2 is a diagram illustrating a vehicle 30 on which the on-vehicle apparatus control system 100 is mounted. FIG. 2 illustrates a state in which the vehicle 30 is viewed from the top.

As illustrated in FIG. 1, the on-vehicle apparatus control system 100 includes an on-vehicle control device 10 and a portable machine 20. In the on-veiled apparatus control system 100, control on an on-vehicle apparatus mounted on the vehicle 30 is performed on the basis of radio signals which are transmitted and received between the on-vehicle control device 10 and the portable machine 20.

In the present embodiment, the control on an on-vehicle apparatus indicates control on a door lock device 7 which locks or unlocks a door of the vehicle 30.

Figure 2:
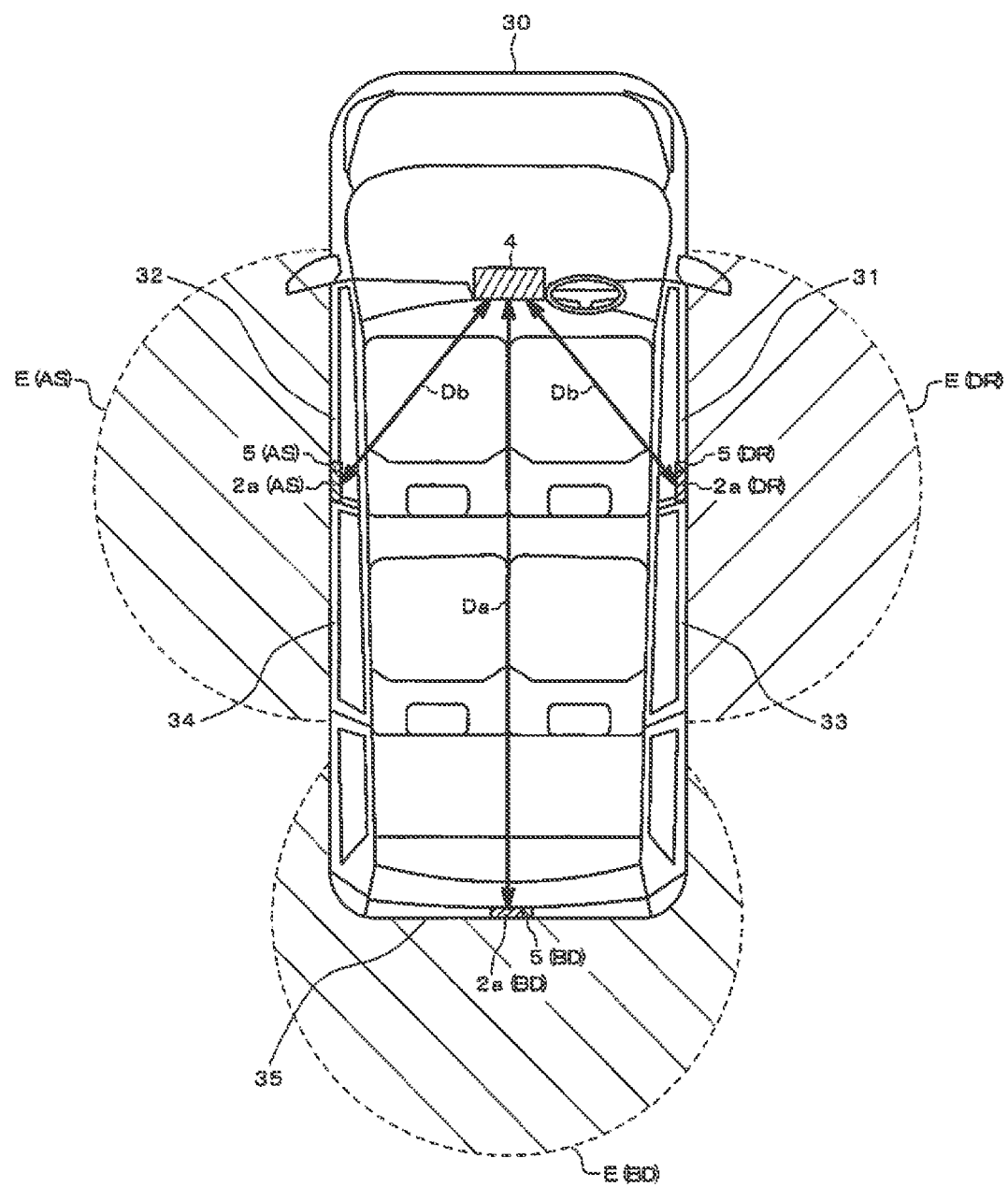
FIG. 2 is a diagram illustrating a vehicle on which an on-vehicle apparatus control system is mounted.

As illustrated in FIG. 2, the vehicle 30 is constituted of an automatic four-wheel vehicle. The vehicle 30 is provided, as doors which can be locked and unlocked, with a door 31 of a driver seat (front right seat), a door 32 of a passenger seat (front left seat), a door 33 of a rear right seat, a door 34 of a rear left seat, and a back door 35 on a rear part of the vehicle 30.

As illustrated in FIG. 1, the on-vehicle control device 10, a passive request switch 5, an engine switch 6, the door lock device 7, and an engine device 8 are mounted on the vehicle 30. The portable machine 20 is carried by a user of the vehicle 30.

The on-vehicle control device 10 includes a control unit 1, a vehicle exterior low frequency (LF) transmission unit 2, a vehicle interior LF transmission unit 3, and an on-vehicle radio frequency (RF) reception unit 4. The control unit 1 is constituted of a CPU, a memory, and the like.

A plurality of vehicle exterior LF transmission units 2 are provided in the vehicle 30. In this example, among the units, the vehicle exterior LF transmission unit 2 (DR) is provided near the driver seat of the vehicle 30. The vehicle exterior LF transmission unit 2 (AS) is provided near the passenger seat of the vehicle 30. The vehicle exterior LF transmission unit 2 (BD) is provided on the rear part of the vehicle 30. Each vehicle exterior LF transmission unit 2 is constituted of constituted of an LF transmission antenna 2a, a transmission signal processing portion (not illustrated), and the like.

In this example, as illustrated in FIG. 2, the LF transmission antenna 2a (DR) of the vehicle exterior LF transmission unit 2 (DR) is provided on a right surface (an outer surface of the door 31 of the driver seat) of the vehicle 30. The LF transmission antenna (AS) of the vehicle exterior LF transmission unit 2 (AS) is provided on a left surface (an outer surface of the door 32 of the passenger seat) of the vehicle 30. The LF transmission antenna 2a (BD) of the vehicle exterior LF transmission unit 2 (BD) is provided on a rear surface (an outer surface of the hack door 35) of the vehicle 30.

The respective vehicle exterior LF transmission units 2(DR), 2(AS) and 2(BD) transmit LF signal generated by the transmission signal processing portions to the portable machine 20 located outside the vehicle interior via the LF transmission antennae 2a (DR), 2a (AS) and 2a (BD).

In FIG. 2, a hatched portion E (DR) is a range in which an LF signal transmitted via the LF transmission antenna 2a (DR) can be received by the portable machine 20. A hatched portion E (AS) is a range in which an LF signal transmitted via the LF transmission antenna 2a (AS) can be received by the portable machine 20. A hatched portion E (BD) is a range in which an LF signal transmitted via the LF transmission antenna 2a (BD) can be received by the portable machine 20.

The vehicle interior LF transmission unit 3 illustrated in FIG. 1 is constituted of an LF transmission antenna 3*a*, a transmission signal processing portion (not illustrated), and the like. At least one vehicle interior LF transmission unit 3 (not illustrated in FIG. 2) is provided in the vehicle interior of the vehicle 30. The vehicle interior LF transmission unit 3 transmits an LF signal generated by the transmission signal processing portion to the portable machine 20 located inside the vehicle interior via the LF transmission antenna 3*a*.

The LF signals transmitted from the vehicle exterior LF transmission unit 2 and the vehicle interior LF transmission unit 3 include a response request signal for the portable machine 20. The vehicle exterior LF transmission unit 2 is an example of an "on-vehicle transmission unit" according to one or more embodiments of the present invention.

The on-vehicle RF reception unit 4 is constituted of an RF reception antenna 4*a*, a reception signal processing portion (not illustrated), and the like. In this example, the on-vehicle RF reception unit 4 is provided alone on a front part of the vehicle interior of the vehicle 30 as illustrated in FIG. 2. The on-vehicle RF reception unit 4 receives an RF signal transmitted from the portable machine 20 via the RF reception antenna 4*a* and the reception signal processing portion. The RF signal received by the on-vehicle RF reception unit 4 includes a response signal and a remote control signal transmitted from the portable machine 20. The on-vehicle RF reception unit 4 is an example of an "on-vehicle reception unit" according to one or more embodiments of the present invention.

The control unit 1 of the on-vehicle control device 10 illustrated in FIG. 1 controls the LF transmission units 2 and 3, and the on-vehicle RF reception unit 4, so as to perform wireless communication with the portable machine 20, and to transmit and receive signals or information to and from the portable machine 20.

The passive request switch 5, the engine switch 6, the door lock device 7, and the engine device 8 are connected to the on-vehicle control device 10.

The passive request switch 5 is operated to lock or unlock the doors 31 to 35 of the vehicle 30. As illustrated in FIG. 2, a plurality of passive request switches 5 are provided on the outer surface of the vehicle 30.

In this example, among the switches, the passive request switch 5 (DR) is provided on an outer knob (outer surface) of the door 31 of the driver seat, so as to be close to the LF transmission antenna 2*a* (DR). The passive request switch 5 (AS) is provided on an outer knob (outer surface) of the door 32 of the passenger seat, so as to be close to the LF transmission antenna 2*a* (AS). The passive request switch 5 (BD) is provided on an outer knob (outer surface) of the back door 35, so as to be close to the LF transmission antenna 2*a* (SD).

In other words, the passive request switches 5 (DR), 5 (AS) and 5 (BD), and the LF transmission antennae 2*a* (DR), 2*a* (AS) and 2*a* (BD) are provided in a proximity state on a one-to-one basis. The passive request switches 5 (DR), 5 (AS) and 5 (BD), and the vehicle exterior LF transmission units 2 (DR), 2 (AS) and 2 (BD) respectively including the LF transmission antennae 2*a* (DR), 2*a* (AS) and 2*a* (BD) are provided on a one-to-one basis.

In this example, the passive request switches 5 (DR) and 5 (AS) on the side part of the vehicle 30 are located at positions which are separated from the on-vehicle RF reception unit 4 by the same distance. The passive request switch 5 (BD) on the rear part of the vehicle 30 is located at a position which is farther from the on-vehicle RF reception unit 4 than the other passive request switches 5 (DR) and 5 (AS). In FIG. 2, a distance Da from the passive request switch 5 (BD) to the on-vehicle RF reception unit 4 is twice or more longer than a distance Db from the other passive request switches 5 (DR) and 5 (AS) to the on-vehicle RF reception unit 4.

The passive request switches 5 (DR), 5 (AS) and 5 (BD) are examples of "an on-vehicle switches" according to one or more embodiments of the present invention. Each of the passive request switches 5 (DR) and 5 (AS) is an example of "a first on-vehicle switch" according to one or more embodiments of the present invention. The passive request switch 5 (BD) is an example of "a second on-vehicle switch" according to one or more embodiments of the present invention.

The engine switch 6 illustrated in FIG. 1 is provided around a driver's seat in the vehicle interior of the vehicle 30. The engine switch 6 is operated in order to start and stop the engine. The control unit 1 of the on-vehicle control device 10 detects operation states of the respective switches 5 and 6 on the basis of output signals from the switches 5 and 6.

The door lock device 7 is constituted of a mechanism locking and unlocking the respective doors 31 to 35 of the vehicle 30, and a driving circuit of the mechanism. The door lock device 7 is an example of an "on-vehicle apparatus" according to one or more embodiments of the present invention. The engine device 8 is constituted of a starter motor starting the engine of the vehicle 30, a driving circuit of the starter motor, and the like.

The portable machine 20 is constituted of an FOB key. The portable machine 20 includes a control unit 21, a portable machine LF reception unit 22, a portable machine RF transmission unit 23, and a door locking/unlocking switch 24. The control unit 21 is constituted of a CPU, a memory, and the like.

The portable machine LF reception unit 22 is constituted of an LF reception antenna 22*a*, a reception signal processing portion (not illustrated), and the like. The portable machine LF reception unit 22 receives an LF signal transmitted from the on-vehicle control device 10 via the LF reception antenna 22*a*. The LF signal received by the portable machine LF reception unit 22 includes the above-described response request signal. The portable machine LF reception unit 22 is an example of a "portable machine reception unit" according to one or more embodiments of the present invention.

The portable machine RF transmission unit 23 is constituted of an RF transmission antenna 23*a*, a transmission signal processing portion (not illustrated), a level switching portion 23*b*, and the like. The portable machine RF transmission unit 23 transmits an RF signal generated by the transmission signal processing portion to the on-vehicle control device 10 via the RF transmission antenna 23*a*. The RF signal transmitted by the portable machine RF transmission unit 23 includes the above-described response signal. The portable machine RF transmission unit 23 is an example of a "portable machine transmission unit" according to one or more embodiments of the present invention.

An arrival distance of an RF signal transmitted from the portable machine RF transmission unit 23 of the portable machine 20 is longer than an arrival distance of an LF signal transmitted from the LF transmission units 2 and 3 of the on-vehicle control device 10.

Figure 3A:
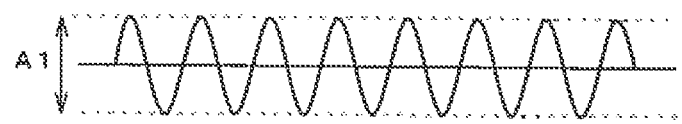
FIGS. 3A to 3C are diagrams illustrating examples of RF signals transmitted by a portable machine illustrated in FIG. 1.
Figure 3B:
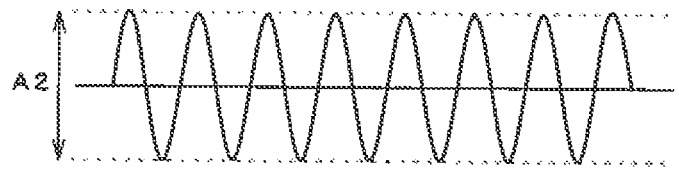
Figure 3C:
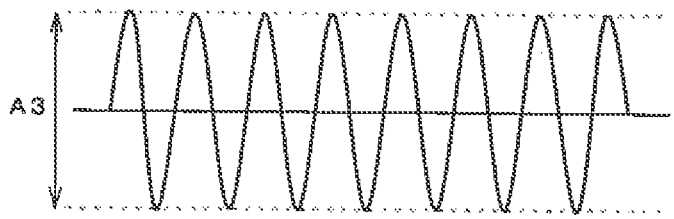

FIGS. 3A to 3C are diagrams illustrating examples of an RF signal transmitted from the portable machine RF transmission unit 23 of the portable machine 20. The level switching portion 23b (FIG. 1) provided in the portable machine RF transmission unit 23 is constituted of a switching circuit which switches the transmission intensity of the RF signal transmitted from the portable machine RF transmission unit 23. The level switching portion 23b switches the transmission intensity of the RF signal among three stages such as a first level, a second level, and a third level illustrated in FIGS. 3A to 3C. Specifically, the level switching portion 23b changes the amplitude of the RF signal in three stages such as A1 to A3.

The amplitude A1 of an RF signal whose transmission intensity is the first level is smaller than the amplitude A2 of an RF signal whose transmission intensity is the second level (A1<A2). The amplitude A2 of an RF signal whose transmission intensity is the second level is smaller than the amplitude A3 of an RF signal whose transmission intensity is the third level (A2<A3). In other words, regarding the transmission intensity of an RF signal, the first level is the lowest, the third level is highest, and the second level is intermediate between the first level and the third level (A1<A2<A3). In other words, among the levels in three stages, the first level is a weak level, the second level is an intermediate level, and the third level is a strong level. The level switching portion 23b is an example of "a level switch" according to one or more embodiments of the present invention.

The control unit 21 (FIG. 1) of the portable machine 20 controls the portable machine LF reception unit 22 and the portable machine RF transmission unit 23 so as to perform wireless communication with the on-vehicle control device 10, and to transmit and receive signals or information to and from the on-vehicle control device 10.

The door locking/unlocking switch 24 is operated in order to lock and unlock the doors 31 to 35 of the vehicle 30 if the door locking/unlocking switch 24 is operated, the control unit 21 generates a remote control signal corresponding to the operation, and transmits the remote control signal to the on-vehicle control device 10 from the portable machine RF transmission unit 23. In other words, the RF signal transmitted by the portable machine RF transmission unit 23 also includes the remote control signal. The door locking/unlocking, switch 24 is an example of "a portable machine switch" according to one or more embodiments of the present invention.

The remote control signal transmitted by the portable machine RF transmission unit 23 includes an ID code (identification information) of the portable machine 20. If the remote control signal is received by the on-vehicle RF reception unit 4 of the on-vehicle control device 10, the control unit 1 collates the ID code of the portable machine 20 with an ID code of the on-vehicle control device 10 stored in advance. In a case where the collation between the ID codes is successful (both of the ID codes match each other), the control unit 1 controls the door lock device 7 to lock or unlock the doors 31 to 35 of the vehicle 30 (keyless entry method).

If the user carrying the portable machine 20 comes close to the vehicle 30, and operates any one of the passive request switches 5, the control unit 1 of the on-vehicle control device 10 transmits a response request signal to the portable machine 20 from the vehicle exterior LF transmission unit 2. If the response request signal is received by the portable machine LF reception unit 22, the control unit 21 of the portable machine 20 generates a response signal including the ID code of the portable machine 20 in response thereto, and transmits the response signal to the on-vehicle control device 10 from the portable machine RF transmission unit 23. If the response signal is received by the on-vehicle RF reception unit 4, the control unit 1 of the on-vehicle control device 10 collates the ID code of the portable machine 20 included in the response signal with the ID code of the on-vehicle control device 10. In a case where the collation between the ID codes is successful, the control unit 1 controls the door lock device 7 on the basis of the response signal so as to lock or unlock the doors 31 to 35 of the vehicle 30 (passive entry method).

If the user carrying the portable machine 20 operates the engine switch 6 in the vehicle interior of the vehicle 30, the control unit 1 performs communication with the portable machine LF reception unit 22 and the portable machine RF transmission unit 23 of the portable machine 20 by using the vehicle interior LF transmission unit 3 and the on-vehicle RF reception unit 4, and collates the ID code of the on-vehicle control device 10 and the ID code of the portable machine 20. If the collation between the ID codes is successful, the control unit 1 controls the engine device 8 to start (or stop) the engine of the vehicle 30.

However, relays (not illustrated) used for a relay attack have a function of relaying transmission and reception of a signal between the on-vehicle control device 10 and the portable machine 20, even if the portable machine 20 is far away from the vehicle 30. As a result, during passive entry, the portable machine 20 which is far away is disguisedly located near the vehicle 30, and thus illegal communication is performed.

Next, operations of the on-vehicle control device 10 and the portable machine 20 according to the first embodiment will be described with reference to FIGS. 4 to 8.

In this example, it is assumed that the portable machine 20 is located outside the vehicle interior of the vehicle 30, and the engine of the vehicle 30 is stopped (this is also the same for other embodiments which will be described later).

Figure 4:
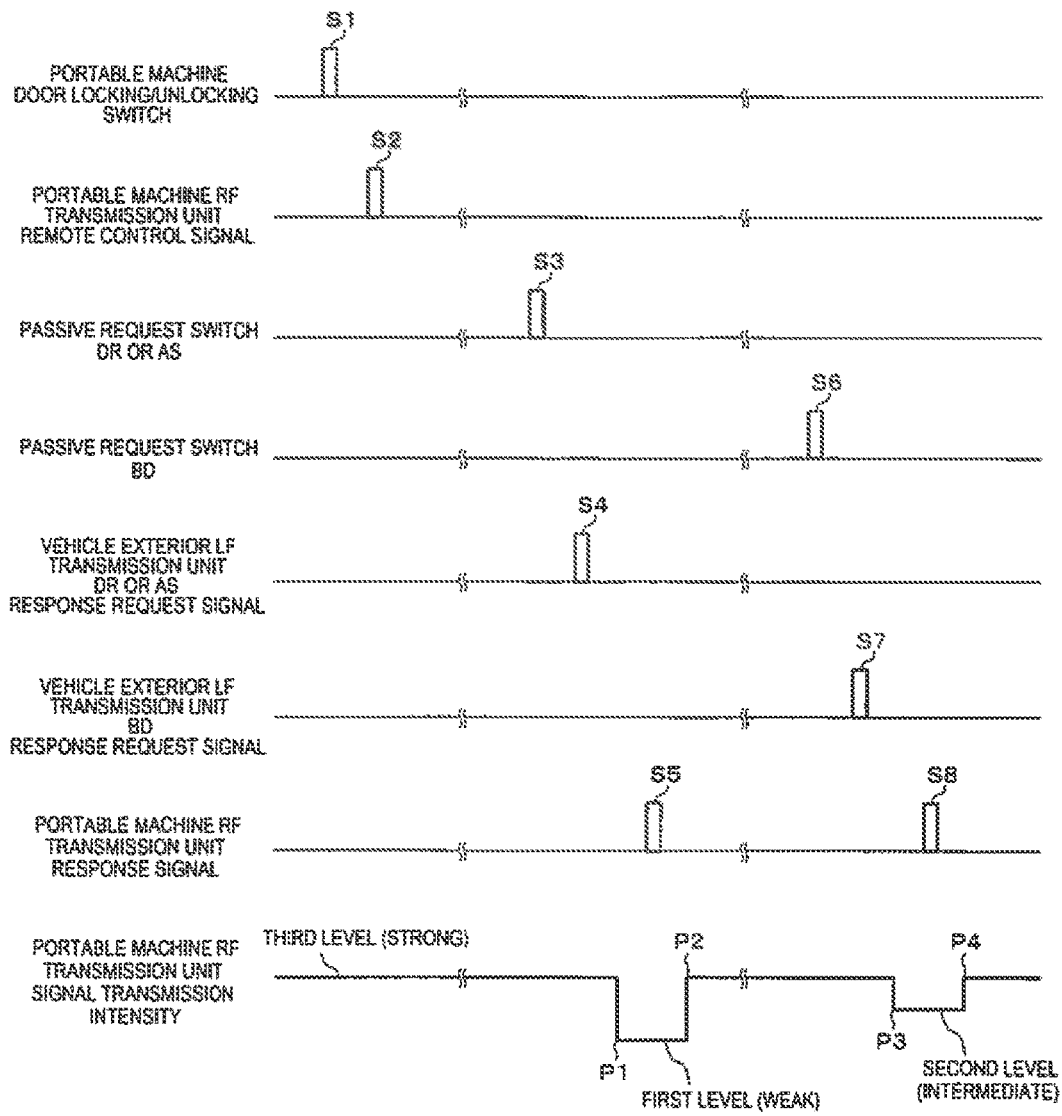
FIG. 4 is a time chart illustrating an example of a communication state between an on-vehicle control device and the portable machine illustrated in FIG. 1.
Figure 5:
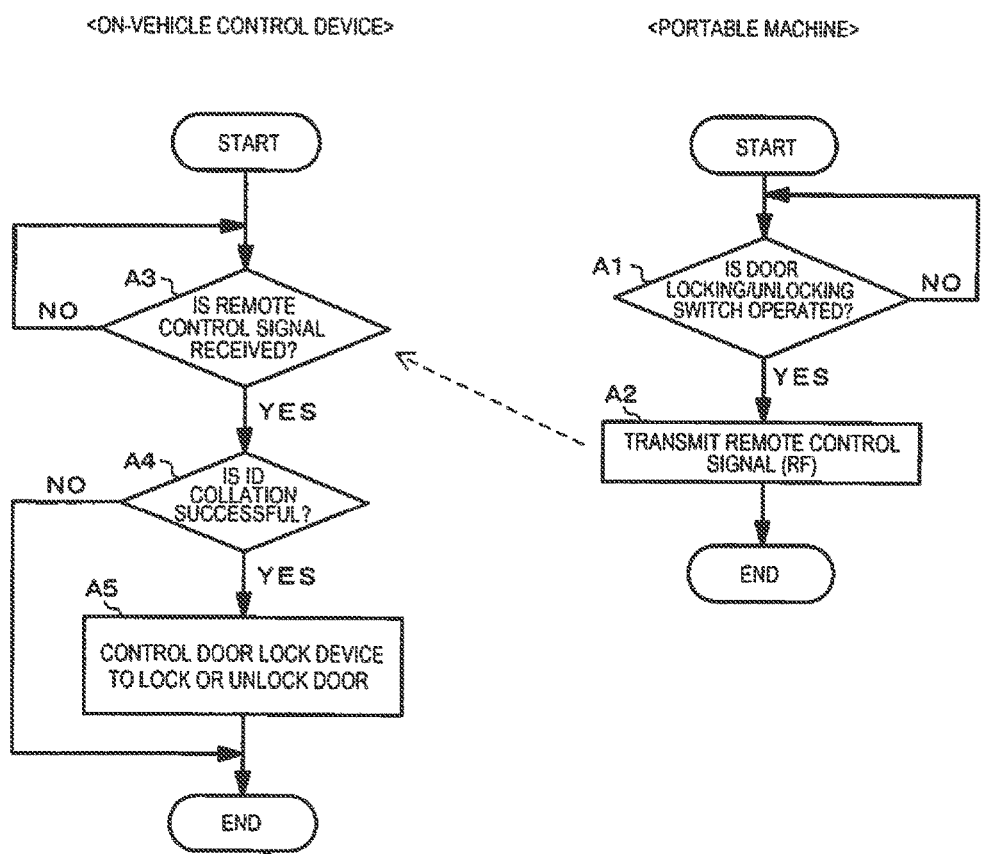
FIG. 5 is a flowchart illustrating operations of the on-vehicle control device and the portable machine illustrated in FIG. 1 during keyless entry.

FIG. 4 is a time chart illustrating an example of a communication state between the on-vehicle control device 10 and the portable machine 20 according to the first embodiment. FIG. 5 is a flowchart illustrating operations of the on-vehicle control device 10 and the portable machine 20 during keyless entry. The flowchart of FIG. 5 is also used in common to a second embodiment and a third embodiment which will be described later.

During a normal time (including the time of keyless entry) in which the passive request switch 5 is not operated, the level switching portion 23b (FIG. 1) of the portable machine 20 switches the transmission intensity of a signal in the portable machine RF transmission unit 23 to the highest third level (refer to FIG. 4).

In a case where keyless entry is performed in this state, first, the user performs an unlocking operation or a locking operation on the door locking/unlocking switch 24 of the portable machine 20 (YES in step A1 in FIG. 5, and S1 in FIG. 4). Then, the control unit 21 causes the portable machine RF transmission unit 23 to transmit a remote control signal (RF signal) corresponding to the operation to the on-vehicle control device 10 (step A2 in FIG. 5, and S2 in FIG. 4). In other words, the remote control signal with the transmission intensity of the third level is transmitted to the on-vehicle control device 10 from the portable machine RF transmission unit 23 (refer to FIG. 4).

In a case where the portable machine 20 is located around the vehicle 30, the remote control signal transmitted from the portable machine 20 is received by the on-vehicle RF reception unit 4 of the on-vehicle control device 10 (YES in step A3 in FIG. 5). Then, the control unit 1 collates the ID code of the portable machine 20 included in the remote control signal with the ID code of the on-vehicle control device 10. Here, if the collation between the ID codes is successful (YES in step A4 in FIG. 5), the control unit 1 controls the door lock device 7 on the basis of the remote control signal, so as to unlock or lock the doors 31 to 35 of the vehicle 30 (step AS in FIG. 5).

On the other hand, if the collation between the ID code of the portable machine 20 included in the remote control signal and the ID code of the on-vehicle control device 10 is not successful (NO in step A4 in FIG. 5), the control unit 1 does not control the door lock device 7, and thus the doors 31 to 35 of the vehicle 30 are not locked or unlocked.

Figure 6:
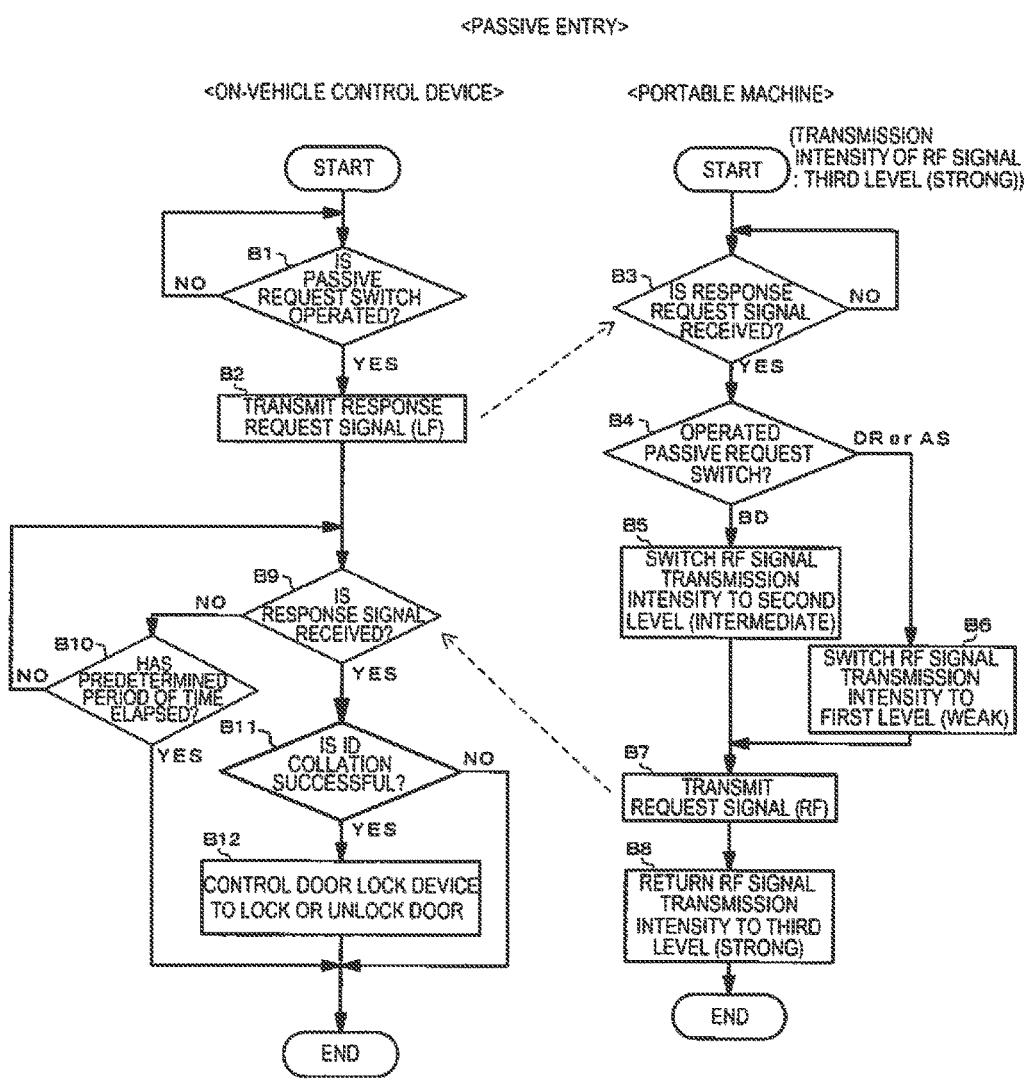
FIG. 6 is a flowchart illustrating operations of the on-vehicle control device and the portable machine illustrated in FIG. 1 during passive entry.

FIG. 6 is a flowchart illustrating operations of the on-vehicle control device 10 and the portable machine 20 of the first embodiment during passive entry.

In a case where the passive entry is performed, first, the user operates any one of the passive request switches 5 (DR), 5 (AS) and 5 (BD) (YES in step B1 in FIG. 6, and S3 or S6 in FIG. 4). Then, the control unit 1 of the on-vehicle control device 10 causes the on-vehicle LF transmission unit 2 (DR), 2 (AS) or 2 (BD) corresponding to the operated passive request switch 5, to transmit a response request signal (LF signal) to the portable machine 20 (step B2 in FIG. 6, and S4 or S7 in FIG. 4). This is so that the portable machine 20 is assumed to be located near the operated passive request switch 5, the response request signal is transmitted via the LF transmission antenna 2a (DR), 2a (AS) or 2a (BD) located around the passive request switch 5, and thus the portable machine 20 easily receives the response request signal.

FIG. 7 is a diagram illustrating an example of information included in the response request signal transmitted by the on-vehicle control device 10 according to the first embodiment. In FIG. 7, the response request signal includes response request information 41, ID request information 42, and passive request switch information 43.

The response request information 41 is information for requesting the portable machine 20 to transmit a response signal. The ID request information 42 is information for requesting the portable machine 20 to transmit an ID code. The passive request switch information 43 is information indicating an operated passive request switch 5, and is, specifically, identification information of the operated passive request switch 5 or position information in the vehicle 30. The operated passive request switch 5 can be recognized on the basis of the passive request switch information 43. The passive request switch information 43 is an example of "information for recognizing am operated on-vehicle switch" according to one or more embodiments of the present invention.

As another example, as illustrated in FIG. 8, LF transmission antenna information 44 may be included in the response request signal instead of the passive request switch information 43, and may be transmitted from the on-vehicle control device 10 to the portable machine 20.

The LF transmission antenna information 44 is information indicating the LF transmission antenna 2a which corresponds to an operated passive request switch 5 and via which the response request signal is transmitted, and is, specifically, identification information of the LF transmission antenna 2a or position information in the vehicle 30. The operated passive request switch 5 can be recognized on the basis of the LF transmission antenna information 44. The LF transmission antenna information 44 is an example of "information for recognizing an operated on-vehicle switch" according to one or more embodiments of the present invention.

In a case where the portable machine 20 is located around the operated passive request switch 5, the response request signal transmitted from the on-vehicle control device 10 is received by the portable machine LF reception unit 22 (YES in step B3 in FIG. 6). Then, the control unit 21 refers to the response request signal, and recognizes the operated passive request switch 5 on the basis of the passive request switch information 43 (or the LF transmission antenna information 44) included in the response request signal.

Here, it is assumed that the control unit 21 recognizes that the operated switch is the passive request switch 5 (DR) disposed on the outer knob of the door 31 of the driver seat or the passive request switch 5 (AS) disposed on the outer knob of the door 32 of the passenger seat (DR or AS step B4 in FIG. 6). In this case, the control unit 21 causes the level switching portion 23b to switch the transmission intensity of an RF signal to the first level lower than the third level or the second level (step B6 in FIG. 6, and P1 in FIG. 4). The control unit 21 causes the portable machine RF transmission unit 23 to transmit a response signal including the ID code of the portable machine 20 to the on-vehicle control device 10 in the transmission intensity of the first level (step B7 in FIG. 6, and S5 in FIG. 4). Thereafter, the control unit 21 causes the level switching portion 23b to return the transmission intensity of an RF signal to the third level (step B8 in FIG. 6, and P2 in FIG. 4).

On the other hand, it is assumed that the control unit 21 recognizes that the operated switch is the passive request switch 5 (BD) disposed on the outer knob of the back door 35 (BD in step B4 in FIG. 6). In this case, the control unit 21 causes the level switching portion 23b to switch the transmission intensity of an RF signal to the second level which is lower than the third level and is higher than the first level (step B5 in FIG. 6, and P3 in FIG. 4). The control unit 21 causes the portable machine RF transmission unit 23 to transmit a response signal to the on-vehicle control device 10 in the transmission intensity of the second level (step B7 in FIG. 6, and S8 in FIG. 4). Thereafter, the control unit 21 causes the level switching portion 23b to return the transmission intensity of an RF signal to the third level (step B8 in FIG. 6, and P4 in FIG. 4).

In the on-vehicle control device 10, in a case where the response signal is received by the on-vehicle RF reception unit 4 (YES in step B9 in FIG. 6) until a predetermined period of time elapses (NO in step B10 in FIG. 6) from the transmission of the response request signal (step B2 in FIG. 6), the control unit 1 collates the ID code of the portable machine 20 included in the response signal with the 10 code of the on-vehicle control device 10. Here, if the collation between the ID codes is successful (YES in step B11 in FIG. 6), the control unit 1 controls the door lock device 7 on the basis of the response signal, so as to unlock or lock the doors 31 to 35 of the vehicle 30 (step B12 in FIG. 6).

On the other hand, in a case where a predetermined period of time has elapsed (YES in step B10 in FIG. 6) without receiving the response signal (NO in step B9 in FIG. 6) after the response request signal is transmitted (step B2 in FIG. 6), the control unit 1 does not control the door lock device 7, and thus the doors 31 to 35 of the vehicle 30 are not locked or unlocked.

In a case where the collation between the ID code of the portable machine 20 included in the response signal and the ID code of the on-vehicle control device 10 is not successful (NO in step B11 in FIG. 6) even if the response signal is received (YES in step B9 in FIG. 6), the control unit 1 does not control the door lock device 7, and thus the doors 31 to 35 of the vehicle 30 are not locked or unlocked.

According to the first embodiment, if a legal user carrying the portable machine 20 operates the passive request switches 5 (DR) and 5 (AS) closer to the on-vehicle RF reception unit 4 than the passive request switch 5 (BD), the level switching portion 23b of the portable machine 20 switches the transmission intensity of an RF signal (response signal) in the portable machine RF transmission unit 23 to the first level (weak). In this case, even if the transmission intensity in the portable machine 20 is weak, the on-vehicle RF reception unit 4 is located at a position close to the portable machine 20, and thus the on-vehicle RF reception unit 4 can receive the response signal transmitted from the portable machine 20. If the legal user operates the passive request switch 5 (BD) farther from the on-vehicle RF reception unit 4 than the passive request switches 5 (DR) and 5 (AS), the level switching portion 23b of the portable machine 20 switches the transmission intensity of an RF signal (response signal) in the portable machine RF transmission unit 23 to the second level (intermediate) which is higher than the first level and is lower than the third level. In this case, since the transmission intensity in the portable machine 20 is strong even if the on-vehicle RF reception unit 4 is located at a position separated from the portable machine 20, the on-vehicle RF reception unit 4 can receive the response signal transmitted from the portable machine 20. Thus, even if the legal user carrying the portable machine 20 operates any passive request switches 5 (DR), 5 (AS) and 5 (BD), a response request signal transmitted from the on-vehicle control device 10 can be received by the portable machine 20, and then a response signal transmitted from portable machine 20 can be received by the on-vehicle RF reception unit 4. Therefore, it is possible to ensure communication performance between the on-vehicle control device 10 and the portable machine 20 during passive entry when a legal user performs an operation.

In the first embodiment, during a normal time in which the passive request switch 5 is not operated, the level switching portion 23b of the portable machine 20 switches the transmission intensity of an RF signal (remote control signal) in the portable machine RF transmission unit 23 to the third level (strong) which is higher than the first level or the second level. Thus, during keyless entry in which the door locking/unlocking switch 24 of the portable machine 20 is operated, a remote control signal transmitted from the portable machine 20 can be easily received by the on-vehicle RF reception unit 4. Therefore, it is possible to ensure communication performance between the on-vehicle control device 10 and the portable machine 20 during passive entry when a legal user performs an operation.

In the first embodiment, during passive entry in which the passive request switch 5 is operated, the transmission intensity of a response signal in the portable machine RF transmission unit 23 is switched to the first level (weak) or the second level (intermediate) which is lower than the third level (strong) during the normal time. Thus, in a case where a relay attack using a relay is performed, it is more difficult for the on-vehicle RF reception unit 4 to receive the response signal which is transmitted from the portable machine 20 and is relayed by the relay than during the normal time. Therefore, it is possible to prevent the relay attack using the relay.

Next, a configuration of an on-vehicle apparatus control system 100 according to a second embodiment will be described with reference to FIG. 9.

Figure 9:
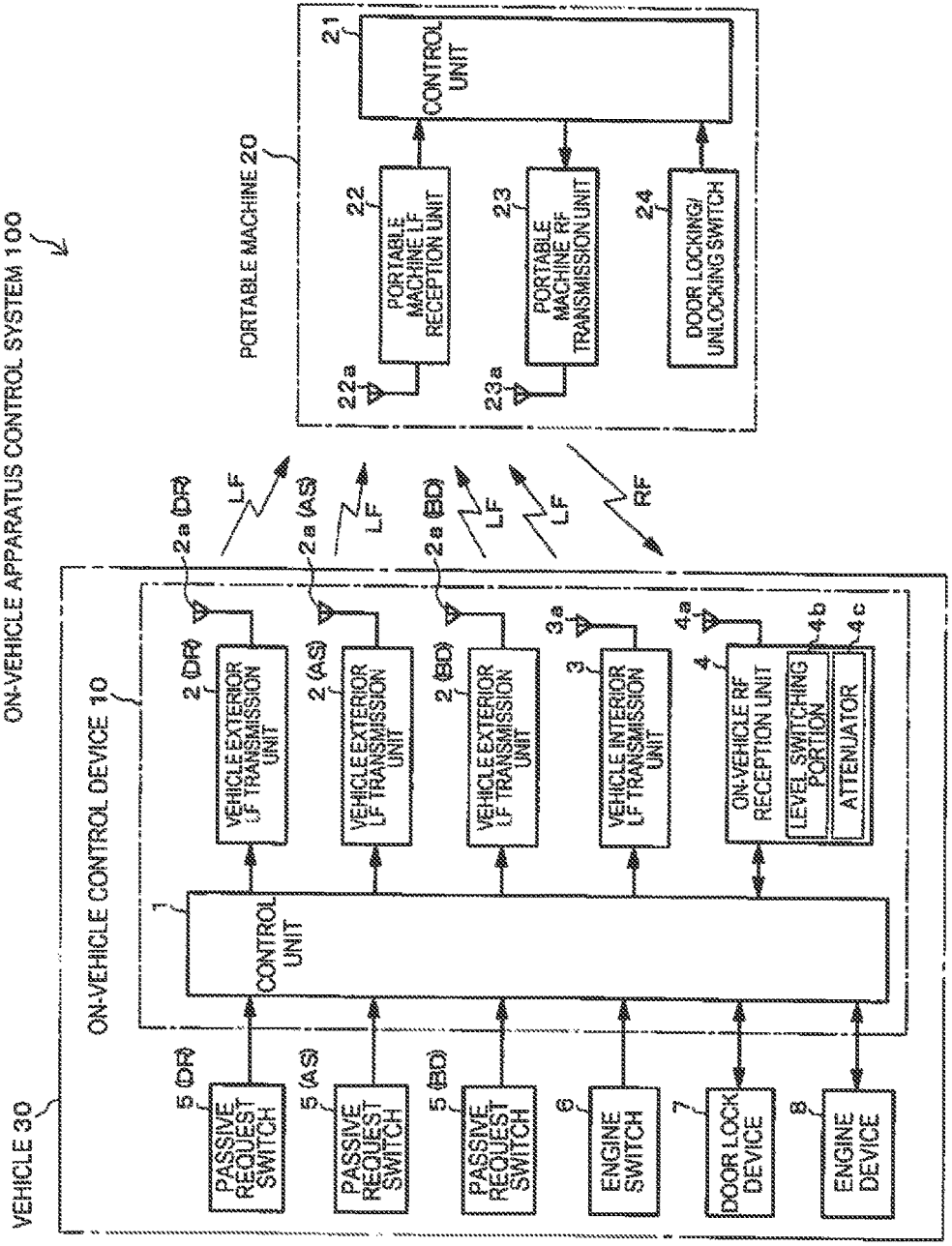
FIG. 9 is a configuration diagram of an on-vehicle apparatus control system according to a second embodiment of the present invention.

FIG. 9 is a configuration diagram of the on-vehicle apparatus control system 100 according to the second embodiment. In the second embodiment, the on-vehicle RF reception unit 4 of the on-vehicle control device 10 is provided with a level switching portion 4b and an attenuator 4c. The portable machine RF transmission unit 23 of the portable machine 20 is not provided with a level switching portion, and thus the transmission intensity of an RF signal in the portable machine RF transmission unit 23 is not variable but constant.

The attenuator 4c of the on-vehicle RF reception unit 4 attenuates a signal received via the RF reception antenna 4a. The level switching portion 4b is constituted of a circuit which changes an attenuation rate of the attenuator 4c so as to switch the reception sensitivity of an RF signal in the on-vehicle RF reception unit 4. The level switching portion 4b changes an attenuation rate in the attenuator 4e in three stages so as to switch the reception sensitivity of an RF signal in the on-vehicle RF reception unit 4 in three stages such as a first level, a second level, and a third level.

Specifically, if an attenuation rate of the attenuator 4c is set to the highest first attenuation rate, the reception sensitivity of an RF signal in the on-vehicle RF reception unit 4 is switched to the lowest first level. If an attenuation rate of the attenuator 4c is set to a second attenuation rate which is lower than the first attenuation rate and is higher than a third attenuation rate, the reception sensitivity of an RF signal in the on-vehicle RF reception unit 4 is switched to a second level which is higher than the first level and is lower than the third level. If an attenuation rate of the attenuator 4c is set to the third attenuation rate lower than the second attenuation rate, the reception sensitivity of an RF signal in the on-vehicle RF reception unit 4 is switched to the third level higher than the second level.

In other words, regarding the reception sensitivity of an RF signal in the on-vehicle RF reception unit 4, the first level is lowest, the third level is highest, and the second level is a level between the First level and the third level. That is, among the levels in three stages, the first level is a weak level, the second level is an intermediate level, and the third level is a strong level. The level switching portion 4b is an example of "a level switch" according to one or more embodiments of the present invention.

Next, operations of the on-vehicle control device 10 and the portable machine 20 according to the second embodiment will be described with reference to FIGS. 5, 10 and 11.

Figure 10:
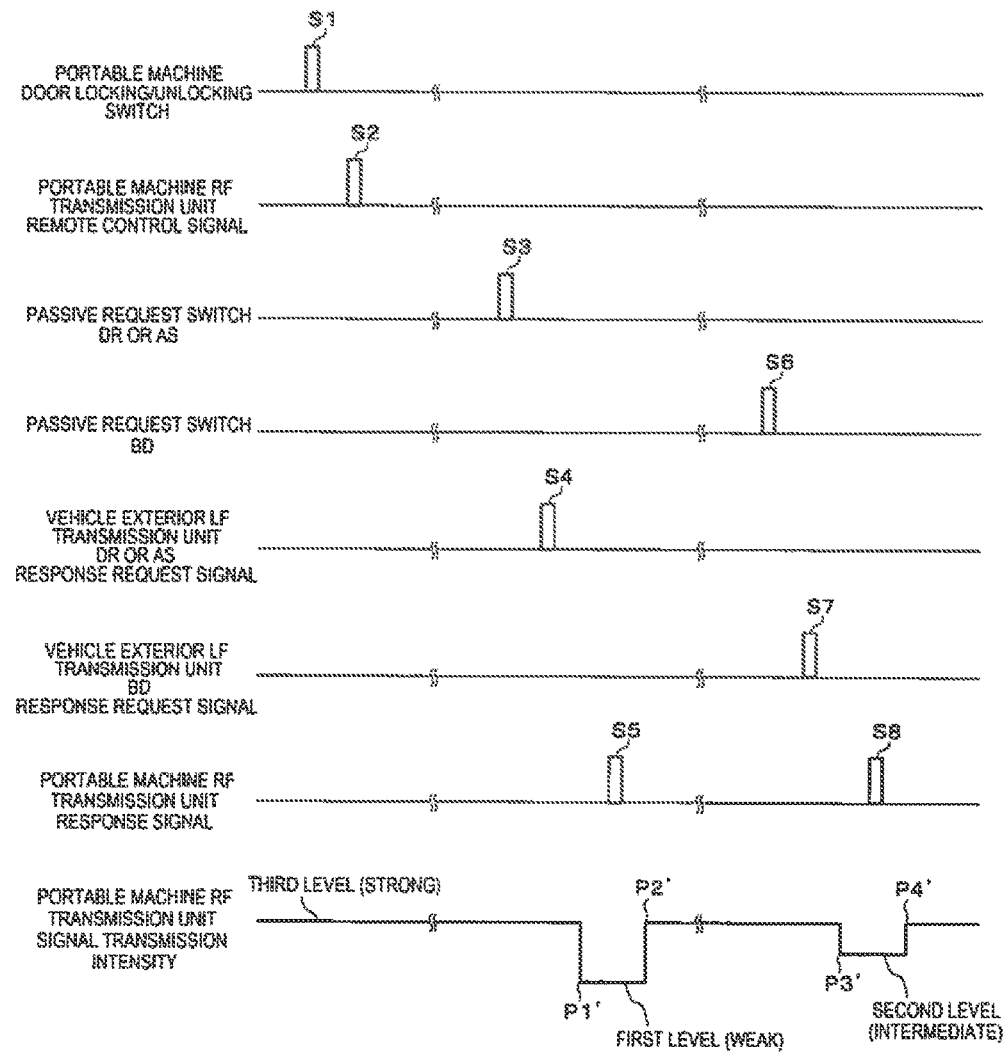
FIG. 10 is a time chart illustrating an example of a communication state between an on-vehicle control device and the portable machine illustrated in FIG. 9.

FIG. 10 is a time chart illustrating an example of a communication state between the on-vehicle control device 10 and the portable machine 20 according to the second embodiment. During a normal time (including the time of keyless entry) in which the passive request switch 5 is not operated, the level switching portion 4b (FIG. 9) of the on-vehicle control device 10 switches the reception sensitivity of a signal in the on-vehicle RF reception unit 4 to the highest third level (refer to FIG. 10).

In a case where keyless entry is performed in this state, as illustrated in FIG. 5, the user performs the door locking/unlocking switch 24 of the portable machine 20 (YES in step A1 in FIG. 5, and S1 in FIG. 10). Then, the control unit 21 causes the portable machine RF transmission unit 23 to transmit a remote control signal to the on-vehicle control device 10 (step A2 in FIG. 5, and S2 in FIG. 10). In this case, the remote control signal with a predetermined transmission intensity is transmitted to the on-vehicle control device 10 from the portable machine RF transmission unit 23.

In a case where the portable machine 20 is located around the vehicle 30, the remote control signal transmitted from the portable machine 20 is received by the on-vehicle RF reception unit 4 of the on-vehicle control device 10 (YES in step A3 in FIG. 5). At this time, the remote control signal is received in the reception sensitivity of the third level by the on-vehicle RF reception unit 4 (refer to FIG. 10).

If the remote control signal is received, the control unit 1 collates the ID code of the portable machine 20 included in the remote control signal with the ID code of the on-vehicle control device 10. Here, if the collation between the ID codes is successful (YES in step A4 in FIG. 5), the control unit 1 controls the door lock device 7 on the basis of the remote control signal, so as to unlock or lock the doors 31 to 35 of the vehicle 30 (step AS in FIG. 5). On the other hand, lithe collation between the ID codes is not successful (NO in step A4 in FIG. 5), the control unit 1 does not control the door lock device 7, and thus the doors 31 to 35 of the vehicle 30 are not locked or unlocked.

Figure 11:
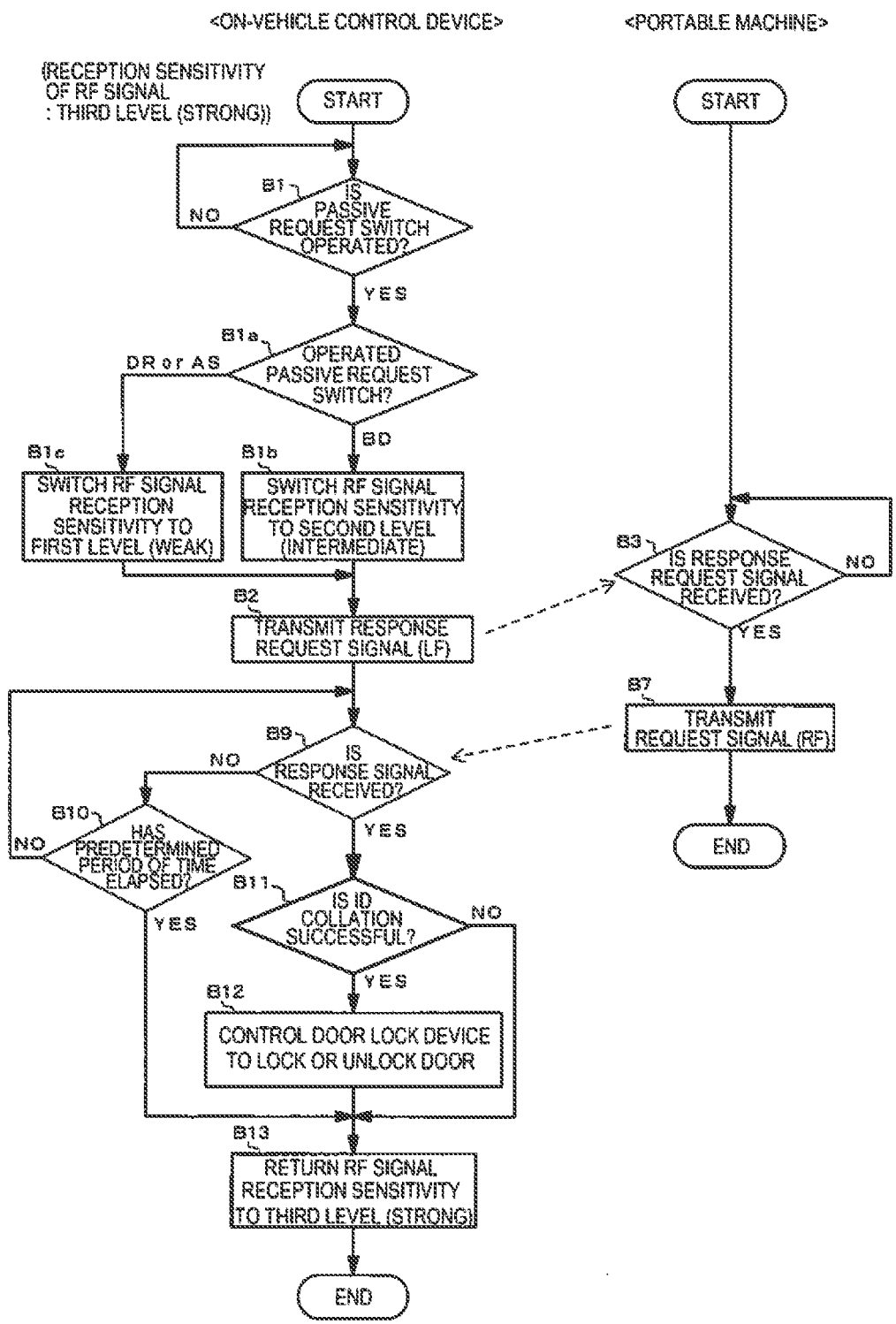
FIG. 11 is a flowchart illustrating operations of the on-vehicle control device and the portable machine illustrated in FIG. 9 during passive entry.

FIG. 11 is a flowchart illustrating operations of the on-vehicle control device 10 and the portable machine 20 of the second embodiment during passive entry.

In FIG. 11, the user operates any one of the passive request switches 5 (DR), 5 (AS) and 5 (BD) (YES in step B1 in FIG. 11). It is assumed that the passive request switch 5 (DR) or 5 (AS) disposed on the outer knob of the door 31 of the driver seat or the door 32 of the passenger seat is operated at this time (DR or AS in step B1*a* in FIG. 11, and S3 in FIG. 10). In this case, the control unit 1 causes the level switching portion 4*b* to switch the reception sensitivity of an RF signal to the first level lower than the third level or the second level (step B1*c* in FIG. 11, and P1' in FIG. 10).

On the other hand, it is assumed that the passive request switch 5 (BD) disposed on the outer knob of the back door 35 is operated (BD in step B1*a* in FIG. 11, and S6 in FIG. 10). In this case, the control unit 1 causes the level switching portion 4*b* to switch the reception sensitivity of an RF signal to the second level which is lower than the third level and is higher than the first level (step B1*b* in FIG. 11, and P3' in FIG. 10).

The control unit 1 causes the on-vehicle LF transmission unit 2 (DR), 2 (AS) or 2 (BD) corresponding to the operated passive request switch 5, to transmit a response request signal to the portable machine 20 (step B2 in FIG. 1, and S4 or S7 in FIG. 10).

The response request signal transmitted from the on-vehicle control device 10 is received by the portable machine LF reception unit 22 (YES in step B3 in FIG. 11). Then, the control unit 21 of the portable machine 20 causes the portable machine RF transmission unit 23 to transmit a response signal including an ID code of the portable machine 20 to the on-vehicle control device 10 (step B7 in FIG. 11, and S5 or S8 in FIG. 10).

The on-vehicle control device 10 transmits the response request signal (step B2 in FIG. 11) and then waits for a response signal to be transmitted from the portable machine 20. In this case, the reception sensitivity of the response signal in the on-vehicle RF reception unit 4 is switched to the first level or the second level.

In a case where the response signal is received in the reception sensitivity of the first level or the second level by the on-vehicle RF reception unit 4 (YES in step B9 in FIG. 11) until a predetermined period of time elapses (NO in step B10 in FIG. 11) from the transmission of the response request signal (step B2 in FIG. 11), the control unit 1 collates the ID code of the portable machine 20 included in the response signal with the ID code of the on-vehicle control device 10. Here, if the collation between the ID codes is successful (YES in step B11 in FIG. 11), the control unit 1 controls the door lock device 7 on the basis of the response signal, so as to unlock or lock the doors 31 to 35 of the vehicle 30 (step B12 in FIG. 11). The control unit 1 causes the level switching portion 4*b* to return the reception sensitivity of the RF signal to the third level (step B13 in FIG. 11, and P2' or P4' in FIG. 10).

On the other hand, in a case where a predetermined period of time has elapsed (YES in step B10 in FIG. 11) without the on-vehicle RF reception unit 4 receiving the response signal in the first level or the second level (NO in step B9 in FIG. 11) after the response request signal is transmitted (step B2 in FIG. 11), the control unit 1 does not control the door lock device 7, and causes the level switching portion 4*b* to return the reception sensitivity of the RF signal to the third level (step B13 in FIG. 11, and P2' or P4' in FIG. 10). In other words, the doors 31 to 35 of the vehicle 30 are not locked or unlocked. In a case where the collation between the ID code of the portable machine 20 included in the response signal and the ID code of the on-vehicle control device 10 is not successful (NO in step B11 in FIG. 11) even lithe response signal is received (YES in step B9 in FIG. 11), the same process as described above is performed.

According to the second embodiment, if a legal user carrying the portable machine 20 operates the passive request switches 5 (DR) and 5 (AS) closer to the on-vehicle RF reception unit 4 than the passive request switch 5 (BD), the level switching portion 4*b* of the on-vehicle control device 10 switches the reception sensitivity of an RF signal (response signal) in the on-vehicle RF reception unit 4 to the first level (weak). In this case, even if the reception sensitivity in the on-vehicle RF reception unit 4 is low, the on-vehicle RF reception unit 4 is located at a position close to the portable machine 20, and thus the on-vehicle RF reception unit 4 can receive the response signal transmitted from the portable machine 20. If the legal user operates the passive request switch 5 (BD) farther from the on-vehicle RF reception unit 4 than the passive request switches 5 (DR) and 5 (AS), the level switching portion 4*b* of the on-vehicle control device 10 switches the reception sensitivity of an RF signal (response signal) in the on-vehicle RF reception unit 4 to the second level (intermediate) which is higher than the first level and is lower than the third level. In this case, since the reception sensitivity in the on-vehicle RF reception unit 4 is high even if the on-vehicle RF reception unit 4 is located at a position separated from the portable machine 20, the on-vehicle RF reception unit 4 can receive the response signal transmitted from the portable machine 20. Thus, even if the legal user carrying the portable machine 20 operates any passive request switches 5 (DR), 5 (AS) and 5 (BD), a response request signal transmitted from the on-vehicle control device 10 can be received by the portable machine 20, and then a response signal transmitted from 20 can be received by the on-vehicle RF reception unit 4. Therefore, it is possible to ensure communication performance between the on-vehicle control device 10 and the portable machine 20 during passive entry when a legal user performs an operation.

In the second embodiment, during a normal time in which the passive request switch 5 is not operated, the level switching portion 4*b* of the on-vehicle control device 10 switches the reception sensitivity of an RF signal (remote control signal) in the on-vehicle RF reception unit 4 to the third level (strong) which is higher than the first level or the second level. Thus, during keyless entry in which the door locking/unlocking switch 24 of the portable machine 20 is operated, a remote control signal transmitted from the portable machine 20 can be easily received by the on-vehicle RF reception unit 4. Therefore, it is possible to ensure communication performance between the on-vehicle control device 10 and the portable machine 20 when a legal user performs an operation during passive entry.

In the second embodiment, during passive entry in which the passive request switch 5 is operated, the reception sensitivity of a response signal in the on-vehicle RF reception unit 4 is switched to the first level (weak) or the second level (intermediate) which is lower than the third level (strong) during the normal time. Thus, in a case where a relay attack using a relay is performed, it is more difficult for the on-vehicle RF reception unit 4 to receive the response signal which is transmitted from the portable machine 20 and is relayed by the relay than during the normal time. Therefore, it is possible to prevent the relay attack using the relay.

Figure 12:
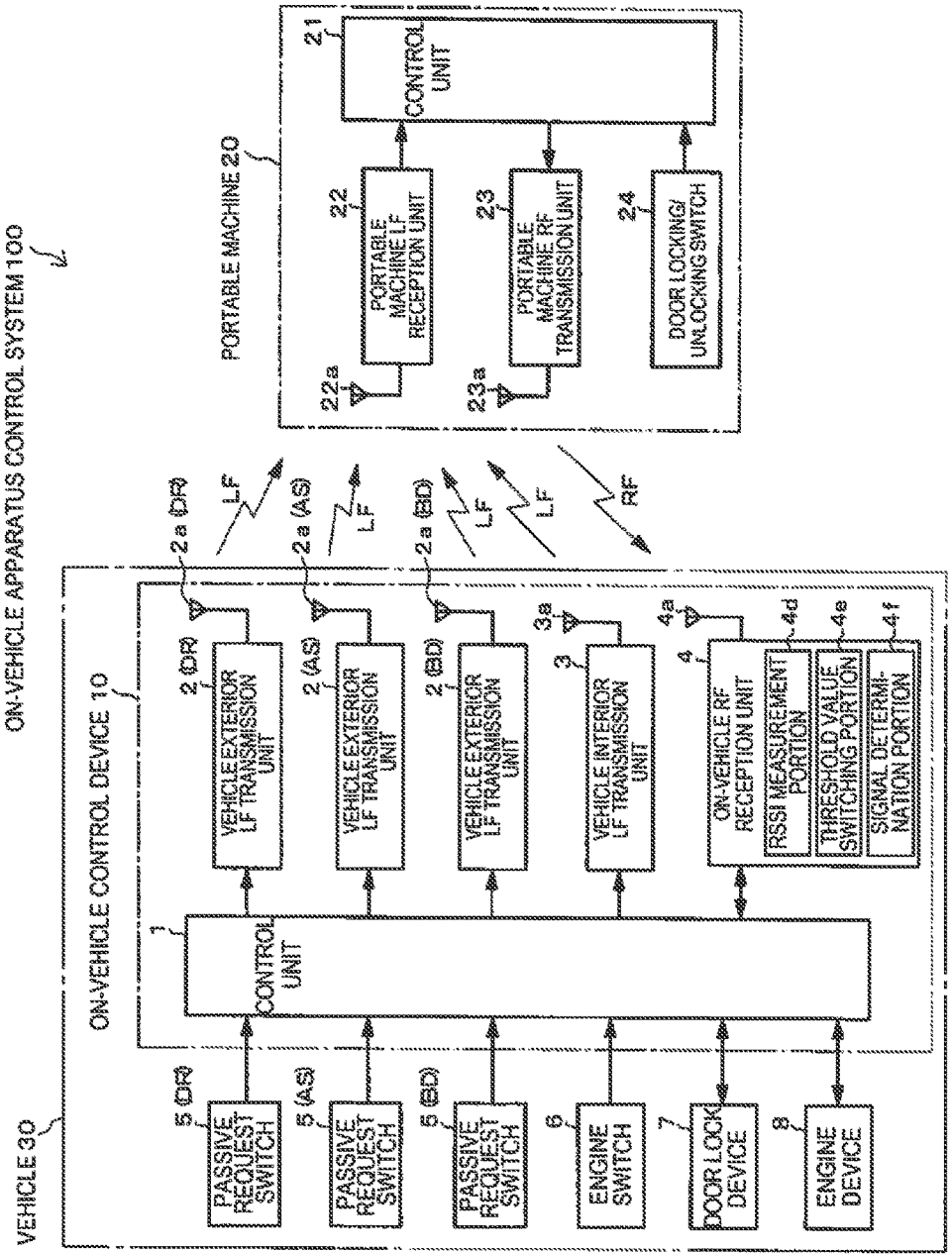
FIG. 12 is a configuration diagram of an on-vehicle apparatus control system according to a third embodiment of the present invention.

FIG. 12 is a configuration diagram of the on-vehicle apparatus control system 100 according to a third embodiment. In the third embodiment, the reception intensity of a signal received via the RF reception antenna 4a is measured, it is determined that an RF signal has been received in a case where the reception intensity is equal to or more than a predetermined threshold value, and the reception sensitivity of the RF signal is switched by changing the threshold value. Thus, the on-vehicle RF reception unit 4 of the on-vehicle control device 10 is provided with an RSSI measurement portion 4d, a threshold value switching portion 4e, and a signal determination portion 4f.

The RSSI measurement portion 4d measures an RSSI value (signal reception intensity) of a signal received via the RF reception antenna 4a. The threshold value switching portion 4e switches a threshold value for signal determination any one of a first threshold value, a second threshold value, and a third threshold value. Among the three threshold values, the first threshold value is the greatest value, the third threshold value is the smallest value, and the second threshold value is a value which is smaller than the first threshold value and is greater than the third threshold value (the first threshold value>the second threshold value>the third threshold value).

The signal determination portion 4f determines that a predetermined RF signal has been received in a case where the RSSI value measured by the RSSI measurement portion 4d is equal to or greater than the threshold value set by the threshold value switching portion 4e, and inputs the RF signal received via the RF reception antenna 4a to a reception signal processing portion provided in the on-vehicle RF reception unit 4. The reception signal processing portion processes the input RF signal so as to detect a response signal or a remote control signal. The threshold value switching portion 4e and the signal determination portion 4f are an example of "a level switch" according to one or more embodiments of the present invention.

If the threshold value switching portion 4e switches a threshold value for signal determination to the greatest first threshold value, the reception sensitivity of an RF signal in the on-vehicle RF reception unit 4 is set to the lowest first level (weak). If the threshold value switching portion 4e switches a threshold value for signal determination to the second threshold value which is smaller than the first threshold value and is greater than the third threshold value, the reception sensitivity of an RF signal in the on-vehicle RF reception unit 4 is set to a second level (intermediate) which is higher than the first level and is lower than the third level. If the threshold value switching portion 4e switches a threshold value for signal determination to the smallest third threshold value, the reception sensitivity of an RF signal in the on-vehicle RF reception unit 4 is set to the third level (strong) higher than the second level.

In the third embodiment, during keyless entry, the on-vehicle control device 10 and the portable machine 20 operate as illustrated in FIG. 5. However, during a normal time in which the passive request switch 5 is not operated, a threshold value for signal determination is switched to the third threshold value by the threshold value switching portion 4, and thus the reception sensitivity of an RF signal in the on-vehicle RF reception unit 4 is set to the third level (strong). Thus, in step A3 in FIG. 5, in the on-vehicle control device 10, the RSSI measurement portion 4d measures an RSSI value received via the RF reception antenna 4a, and the signal determination portion 4f compares the RSSI value with the third threshold value. Only in a case where the RSSI value is equal to or greater than the third threshold value, the signal received via the RF reception antenna 4a undergoes reception processing, and thus a remote control signal transmitted from the portable machine 20 is detected. In other words, the remote control signal is received in the reception sensitivity of the third level by the on-vehicle RF reception unit 4 (YES in step A3 in FIG. 5).

Figure 13:
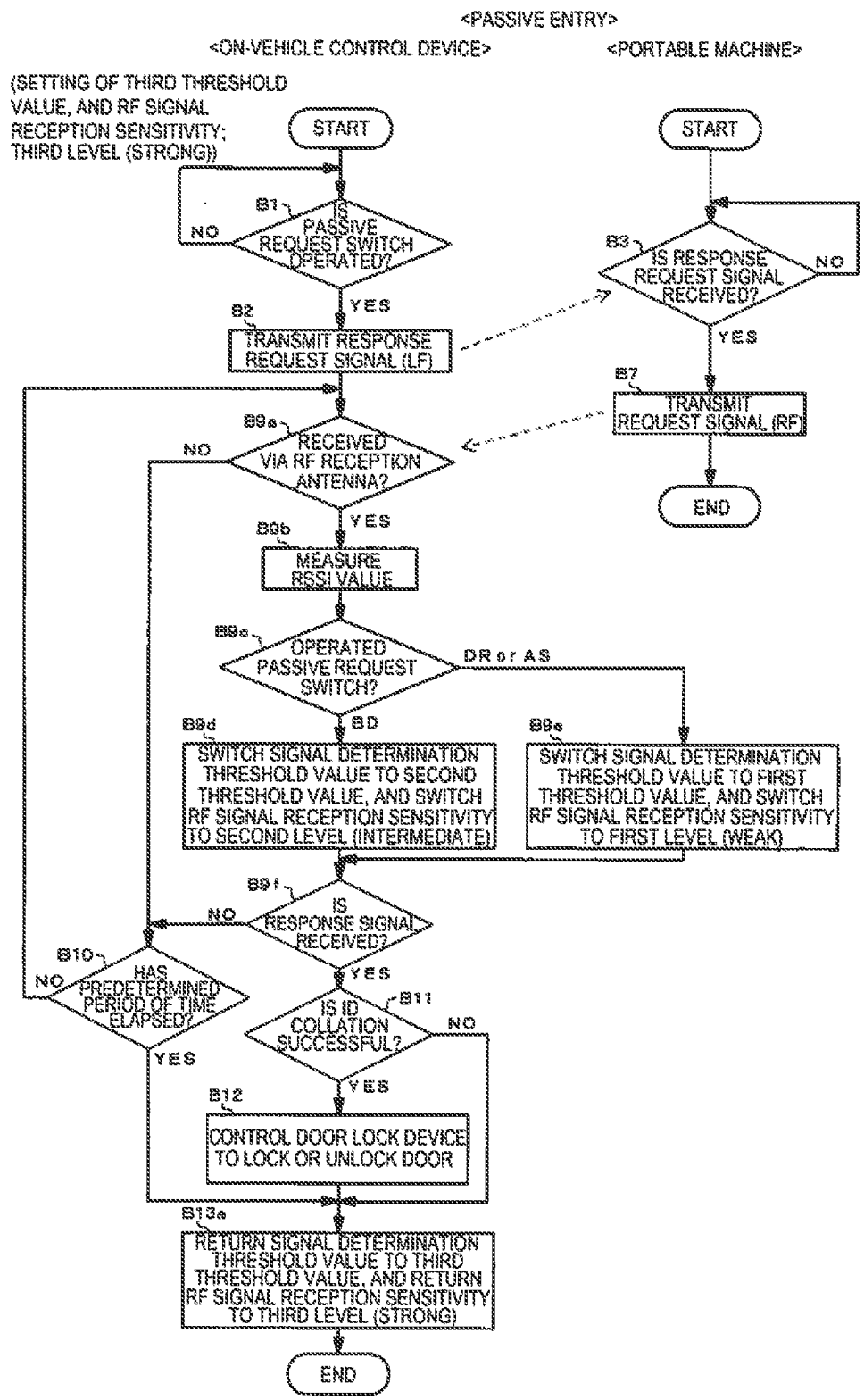
FIG. 13 is a flowchart illustrating operations of the on-vehicle control device and the portable machine illustrated in FIG. 12 during passive entry.

FIG. 13 is a flowchart illustrating operations of the on-vehicle control device 10 and the portable machine 20 of the third embodiment during passive entry.

During passive entry, if the passive request switch 5 is operated (YES in step B1 in FIG. 13), the on-vehicle control device 10 response request signal to the portable machine 20 (step B2 in FIG. 13), if the response request signal is received (YES in step B3 in FIG. 13), the portable machine 20 transmits a response signal to the on-vehicle control device 10 (step B7 in FIG. 3).

If the on-vehicle control device 10 receives a signal via the RF reception antenna 4a (YES in step B9a in FIG. 13) after transmitting the response request signal, an RSSI value of the signal is measured by the RSSI measurement portion 4d (step B9b in FIG. 13). The control unit 1 confirms the passive request switch 5 operated in step B1. If the operated switch is the passive request switch 5 (DR) or 5 (AS) disposed on the outer knob of the door 31 of the driver seat or the door 32 of the passenger seat (DR or AS in step B9c in FIG. 13), the control unit 1 causes the threshold value switching portion 4e to switch a threshold value for signal determination to the first threshold value, and thus the reception sensitivity of an RF signal in the on-vehicle RF reception unit 4 is switched to the first level (step B9e in FIG. 13).

On the other hand, if the operated switch is the passive request switch 5 (BD) disposed on the outer knob of the back door 35 (BD in step B9c in FIG. 13), the control unit 1 causes the threshold value switching portion 4e to switch a threshold value for signal determination to the second threshold value, and thus the reception sensitivity of an RF signal in the on-vehicle RF reception unit 4 is switched to the second level (step B9d in FIG. 13).

If the threshold value and the reception sensitivity are switched as mentioned above, the signal determination portion 4f compares an RSSI value measured by the RSSI measurement portion 4d with the threshold value set by the threshold value switching portion 4e. Only in a case where the RSSI value is equal to or greater than the threshold value, the signal received via the RF reception antenna 4a undergoes reception processing, and thus a response signal transmitted from the portable machine 20 is detected. In other words, the response signal is received in the reception sensitivity of the first level or the second level by the on-vehicle RF reception unit 4 (YES in step B9f in FIG. 13). Thereafter, if collation between an ID code of the portable machine 20 including the response signal and an ID code of the on-vehicle control device 10 is successful (YES in step B11 in FIG. 13), the control unit 1 controls the door lock device 7 on the basis of the response signal, so as to unlock or lock the doors 31 to 35 of the vehicle 30 (step B12 in FIG. 13). The control unit 1 causes the threshold value switching portion 4e to return a threshold value for signal determination to the third threshold value, and thus the reception sensitivity of an RF signal to the third level (step B13a in FIG. 13).

On the other hand, in a case where a predetermined period of time has elapsed (YES in step B11 in FIG. 13) without receiving a signal via the RF reception antenna 4a (NO in step B9a in FIG. 13) or without the on-vehicle RF reception unit 4 receiving the response signal (NO in step B9f in FIG. 13) after the response request signal is transmitted (step B2 in FIG. 13), the control unit 1 does not control the door lock device 7, and causes the threshold value switching portion 4e to return a threshold value for signal determination to the third threshold value so that the reception sensitivity of the RF signal is returned to the third level (step B13a in FIG. 13). In other words, the doors 31 to 35 of the vehicle 30 are not locked or unlocked. In a case where the collation between the ID code of the portable machine 20 and the ID code of the on-vehicle control device 10 is not successful (NO in step B11 in FIG. 13) even if the response signal is received (YES in step B9f in FIG. 13), the same process as described above is performed.

According to the third embodiment, if one of the passive request switches 5 (DR) and 5 (AS) is operated, the threshold value switching portion 4e of the on-vehicle control device 10 switches a threshold value for signal determination to the first threshold value, and thus the reception sensitivity of an RF signal (response signal) in the on-vehicle RF reception unit 4 is switched to the first level (weak). In this case, even if the reception sensitivity in the on-vehicle RF reception unit 4 is low, the on-vehicle RF reception unit 4 is located at a position close to the portable machine 20, and thus the on-vehicle RF reception unit 4 can receive the response signal transmitted from the portable machine 20. If the passive request switch 5 (BD) is operated, the threshold value switching portion 4e switches a threshold value for signal determination to the second threshold value, and thus the reception sensitivity of an RF signal (response signal) in the on-vehicle RF reception unit 4 is switched to the second level (intermediate) which is higher than the first level and is lower than the third level. In this case, since the reception sensitivity in the on-vehicle RF reception unit 4 is high even if the on-vehicle RF reception unit 4 is located at a position separated from the portable machine 20, the on-vehicle RF reception unit 4 can receive the response signal transmitted from the portable machine 20. Thus, even if the legal user carrying the portable machine 20 operates any passive request switches 5 (DR), 5 (AS) and 5 (BD), a response signal transmitted from 20 transmitted after the portable machine 20 receives a response request signal can be received by the on-vehicle RF reception unit 4

Therefore, it is possible to ensure communication performance between the on-vehicle control device 10 and the portable machine 20 during passive entry when a legal user performs an operation.

In the third embodiment, during a normal time in which the passive request switch 5 is not operated, the threshold value switching portion 4e switches a threshold value for signal determination to the third threshold value, and thus the reception sensitivity of an RF signal (remote control signal) in the on-vehicle RF reception unit 4 is switched to the third level which is higher than the first level or the second level. Thus, during keyless entry in which the door locking/unlocking switch 24 of the portable machine 20 is operated, a remote control signal transmitted from the portable machine 20 can be easily received by the on-vehicle RF reception unit 4. Therefore, it is possible to ensure communication performance between the on-vehicle control device 10 and the portable machine 20 when a legal user performs an operation during passive entry.

In the third embodiment, during passive entry in which the passive request switch 5 is operated, the threshold value switching portion 4e switches a threshold value for signal determination to the first threshold value or the second threshold value, and thus the reception sensitivity of a response signal in the on-vehicle RF reception unit 4 is switched to the first level (weak) or the second level (intermediate) which is lower than the third level (strong) during the normal time. Thus, in a case where a relay attack using a relay is performed, it is more difficult for the on-vehicle RF reception unit 4 to receive the response signal which is transmitted from the portable machine 20 and is relayed by the relay than during the normal time. Therefore, it is possible to prevent the relay attack using the relay.

The present invention may employ various embodiments other than the above-described embodiments. For example, in the third embodiment, as illustrated in FIG. 13, an example has been described in which, after a signal is received via the RF reception antenna 4a, the threshold value switching portion 4e switches a threshold value for signal determination to the first threshold value or the second threshold value so that the reception sensitivity of an RF signal in the on-vehicle RF reception unit 4 is switched to the first level or the second level, but the present invention is not limited thereto. For example, right before or right after a response request signal is transmitted, the threshold value switching portion 4e may switch a threshold value for signal determination to the first threshold value or the second threshold value so that the reception sensitivity of an RF signal in the on-vehicle RF reception unit 4 is switched to the first level or the second level. Right after a response signal is received, or after a predetermined period of time elapses without receiving a response signal, the threshold value switching portion 4e may return a threshold value for signal determination to the third threshold value so that the reception sensitivity of an RF signal in the on-vehicle RF reception unit 4 may be returned to the third level in other words, only in a case where a response signal transmitted from the portable machine 20 is received, the reception sensitivity of an RF signal in the on-vehicle RF reception unit 4 may be set to the first level or the second level.

In the second embodiment, as illustrated in FIG. 11, an example has been described in which the reception sensitivity of an RF signal in the on-vehicle RF reception unit 4 is switched to the first level or the second level before a response request signal is transmitted, the doors 31 to 35 are locked or unlocked after a response signal is received, or a predetermined period of time has elapsed without receiving the response signal, and then the reception sensitivity of an RF signal in the on-vehicle RF reception unit 4 is returned to the third level, but the present invention is not limited thereto. For example, the reception sensitivity of an RF signal in the on-vehicle RF reception unit 4 may be switched to the first level or the second level right after a response request signal is transmitted. For example, the reception sensitivity of an RF signal in the on-vehicle RF reception unit 4 may be returned to the third level right after a response signal is received, or after a predetermined period of time elapses without receiving a response signal. In other words, only in a case where a response signal transmitted from the portable machine 20 in response to a response request signal is received, the reception sensitivity of an RF signal in the on-vehicle RF reception unit 4 may be set to the first level or the second level.

In the above-described embodiments, an example has been described in which the three passive request switches 5, the three vehicle exterior LF transmission units 2, and the single on-vehicle RF reception unit 4 are provided in the vehicle 30, but the present invention is not limited thereto. The number of passive request switches, vehicle exterior LF transmission units, and on-vehicle RF reception units to be provided may be selected as appropriate depending on a vehicle.

Positions where the passive request switch 5, the vehicle interior LF transmission unit 3, the vehicle exterior LF transmission unit 2, the LF transmission antenna 2a, and the on-vehicle RF reception unit 4 are not limited to the example illustrated in FIG. 2, and may be set as appropriate depending on the vehicle 30. For example, the on-vehicle RF reception unit 4 may be provided on a rear part in the vehicle interior of the vehicle 30. In this case, the passive request switch 5 (BD) close to the on-vehicle RF reception unit 4 corresponds to the first on-vehicle switch, and each of the passive request switches 5 (DR) and 5 (AS) separated from the on-vehicle RF reception unit 4 corresponds to the second on-vehicle switch switch. When the passive request switch 5 (BD) is operated, the transmission intensity in the portable machine 20 or the reception sensitivity in the on-vehicle RF reception unit 4 is low, and when the passive request switches 5 (DR) and 5 (AS) are operated, the transmission intensity in the portable machine 20 or the reception sensitivity in the on-vehicle RF reception unit 4 is high.

The on-vehicle RF reception unit 4 may be provided at a position biased to either of the left and right sides with respect to the center of the vehicle 30. Distances between the on-vehicle RF reception unit 4 and the respective LF transmission antennae 2a (DR), 2a (AS) and 2a (BD) may be different from each other.

In the third embodiment, an example has been described in which an RSSI value of a signal received via the RF reception antenna 4a is measured by the RSSI measurement portion 4d, and a remote control signal or a response signal is detected from the signal received via the RF reception antenna 4a in a case where the RSSI value is equal to or greater than a threshold value set by the threshold value switching portion 4e, but the present invention is not limited thereto. For example, it may be determined whether or not a signal can be received on the basis of a threshold value set by the threshold value switching portion 4e, and a remote control signal or a response signal may be detected from the signal output via the RF reception antenna 4a in a case where an output level of the RF reception antenna 4a is equal to or more than a threshold value (a signal can be received). In this case, it is not necessary to measure an RSSI value of a signal received via the RF reception antenna 4a, and thus the RSSI measurement portion 4d may be omitted.

In the above-described embodiments, as an example of control on an on-vehicle apparatus performed by the on-vehicle apparatus control system 100, locking or unlocking of the doors 31 to 35 performed by the door lock device 7 has been described, but the present invention is not limited thereto. For example, control on other on-vehicle apparatuses such as starting of the engine performed by the engine device 8 mounted on the vehicle, driving of an air conditioner performed by an air conditioner device, and driving of an audio system may be performed.

In the above-described embodiments, a description has been made of an example in which the present invention is applied to the on-vehicle apparatus control system 100, the on-vehicle control device 10, and the portable machine 20 for an automatic four-wheel vehicle, but the present invention is also applicable to an on-vehicle apparatus control system, an on-vehicle control device, and a portable machine for other vehicles such as a motorcycle or a large vehicle.

While the invention has been described with respect to a limited number of embodiments, those skilled in the art, having benefit of this disclosure, will appreciate that other embodiments can be devised which do not depart from the scope of the invention as disclosed herein. According, the scope of the invention should be limited only by the attached claims.

The invention claimed is:

1. An on-vehicle apparatus control system comprising:
a plurality of on-vehicle switches disposed on an outer surface of a vehicle;
an on-vehicle control device mounted on the vehicle and comprising an on-vehicle transmission unit and an on-vehicle reception unit; and
a portable machine carried by a user and comprising a portable machine transmission unit and a portable machine reception unit,
wherein in a case where one of the on-vehicle switches is operated,
the on-vehicle control device causes the on-vehicle transmission unit to transmit a response request signal,
the portable machine causes the portable machine transmission unit to return a response signal in response to reception of the response request signal in the portable machine reception unit, and
the on-vehicle control device causes the on-vehicle reception unit to receive the response signal, and controls an on-vehicle apparatus mounted on the vehicle on a basis of the response signal,
wherein the on-vehicle switches comprise:
a first on-vehicle switch; and
a second on-vehicle switch located at a position farther from the on-vehicle reception unit than the first on-vehicle switch,
wherein the on-vehicle apparatus control system further comprises a level switch that switches transmission intensity of a signal transmitted from the portable machine transmission unit, or reception sensitivity of a signal received by the on-vehicle reception unit,
wherein in a case where the first on-vehicle switch is operated, the level switch switches the transmission intensity or the reception sensitivity to a first level, and
wherein in a case where the second on-vehicle switch is operated, the level switch switches the transmission intensity or the reception sensitivity to a second level higher than the first level.

2. The on-vehicle apparatus control system according to claim 1,
wherein the portable machine further comprises a portable machine switch that operates the on-vehicle apparatus, and causes the portable machine transmission unit to transmit a remote control signal when the portable machine switch is operated,
wherein the on-vehicle control device causes the on-vehicle reception unit to receive the remote control signal, and controls the on-vehicle apparatus on a basis of the remote control signal, and wherein during a normal time in which the on-vehicle switches are not operated, the level switch switches the transmission intensity or the reception sensitivity to a third level higher than the second level.

3. An on-vehicle control device mounted on a vehicle, the on-vehicle control device comprising:

an on-vehicle transmission unit; and
an on-vehicle reception unit, wherein in a case where one of a first on-vehicle switch disposed on an outer surface of the vehicle and a second on-vehicle switch disposed on the outer surface of the vehicle and farther from the on-vehicle reception unit than the first on-veil/de switch is operated, the on-vehicle transmission unit transmits a response request signal to a portable machine carried by a user, and the on-vehicle reception unit receives a response signal transmitted from the portable machine in response to reception of the response request signal in the portable machine, and an on-vehicle apparatus mounted on the vehicle is controlled on a basis of the response signal, and wherein in a case where the first on-vehicle switch is operated, transmission intensity of a signal transmitted from the portable machine or reception sensitivity of a signal received by the on-vehicle reception unit is set to a first level, and wherein in a case where the second on-vehicle switch is operated, the transmission intensity or the reception sensitivity is set to a second level higher than the first level.

4. The on-vehicle control device according to claim 3, wherein the on-vehicle transmission unit transmits the response request signal to the portable machine:

in a case where the first on-vehicle switch is operated, the response request signal comprising information for recognizing the first on-vehicle switch so as to allow the portable machine to set signal transmission intensity to a first level; and in a case where the second on-vehicle switch is operated, the response request signal comprising information for recognizing the second on-vehicle switch so as to allow the portable machine to set signal transmission intensity to a second level higher than the first level.

5. The on-vehicle control device according to claim 3, further comprising:

a level switch that switches reception sensitivity of a signal received by the on-vehicle reception unit, wherein in a case where the first on-vehicle switch is operated, the level switch switches the reception sensitivity to a first level, and wherein in a case where the second on-vehicle switch is operated, the level switch switches the reception sensitivity to a second level higher than the first level.

6. The on-vehicle control device according to claim 5, wherein in a case where a portable machine switch disposed in the portable machine is operated, the on-vehicle reception unit receives a remote control signal transmitted from the portable machine, and the on-vehicle apparatus is controlled on a basis of the remote control signal, and wherein during a normal time in which the first on-vehicle switch and the second on-vehicle switch are not operated, the level switch switches the reception sensitivity to a third level higher than the second level.

7. A portable machine carried by a user, the portable machine comprising:

a portable machine transmission unit; and
a portable machine reception unit, wherein in a case where one of a first on-vehicle switch disposed on an outer surface of a vehicle and a second on-vehicle switch disposed on the outer surface of the vehicle and farther from an on-vehicle reception unit than the first on-vehicle switch is operated, the portable machine reception unit receives a response request signal transmitted from an on-vehicle control device mounted on the vehicle, and the portable machine transmission unit transmits a response signal to the on-vehicle control device so as to allow the on-vehicle control device to control an on-vehicle apparatus mounted on the vehicle, wherein the portable machine further comprises a level switch that switches transmission intensity of a signal transmitted from the portable machine transmission unit, wherein if the portable machine reception unit receives the response request signal from the on-vehicle control device, information included in the response request signal for recognizing an operated on-vehicle switch is referred to, wherein in a case where the operated on-vehicle switch is the first on-vehicle switch, the level switch switches the transmission intensity to a first level, and wherein in a case where the operated on-vehicle switch is the second on-vehicle switch, the level switch switches the transmission intensity to a second level higher than the first level.

8. The portable machine according to claim 7, further comprising:

a portable machine switch which operates the on-vehicle apparatus, wherein in a case where the portable machine switch is operated, the portable machine transmission unit transmits a remote control signal to the on-vehicle control device so as to allow the on-vehicle control device to control the on-vehicle apparatus, and wherein during a normal time in which the on-vehicle switches are not operated, the level switch switches the transmission intensity to a third level higher than the second level.

* * * * *